United States Patent
Zhang et al.

(10) Patent No.: US 11,558,612 B2
(45) Date of Patent: *Jan. 17, 2023

(54) COEFFICIENT DEPENDENT CODING OF TRANSFORM MATRIX SELECTION

(71) Applicants: Beijing Bytedance Network Technology Co., Ltd., Beijing (CN); Bytedance Inc., Los Angeles, CA (US)

(72) Inventors: Li Zhang, San Diego, CA (US); Hongbin Liu, Beijing (CN); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,984

(22) Filed: Jun. 22, 2021

(65) Prior Publication Data

US 2021/0329242 A1 Oct. 21, 2021

Related U.S. Application Data

(63) Continuation of application No. 17/102,219, filed on Nov. 23, 2020, now Pat. No. 11,082,693, which is a (Continued)

(30) Foreign Application Priority Data

Aug. 16, 2018 (WO) ............... PCT/CN2018/100795

(51) Int. Cl.
*H04N 19/00* (2014.01)
*H04N 19/12* (2014.01)
(Continued)

(52) U.S. Cl.
CPC .......... *H04N 19/12* (2014.11); *H04N 19/136* (2014.11); *H04N 19/176* (2014.11); *H04N 19/60* (2014.11); *H04N 19/625* (2014.11); *H04N 19/70* (2014.11)

(58) Field of Classification Search
CPC .... H04N 19/12; H04N 19/176; H04N 19/136; H04N 19/60; H04N 19/625; H04N 19/70
See application file for complete search history.

(56) References Cited

U.S. PATENT DOCUMENTS

| 9,723,313 B2 | 8/2017 | Yang et al. |
| 11,082,693 B2 | 8/2021 | Zhang et al. |

(Continued)

FOREIGN PATENT DOCUMENTS

| CA | 2971880 A1 | 8/2016 |
| CA | 3041856 A1 | 7/2018 |

(Continued)

OTHER PUBLICATIONS

Non-Final Office Action from U.S. Appl. No. 17/102,274 dated Feb. 3, 2021.

(Continued)

*Primary Examiner* — Zhihan Zhou
(74) *Attorney, Agent, or Firm* — Perkins Coie LLP

(57) ABSTRACT

A video processing method includes checking, during a conversion from a coded representation of a current video block to the current video block, a position of a last non-zero coefficient of the current video block, wherein the position is relative to a top-left position of the current video block; and performing a determination, based on the position, whether or not to parse a syntax element which signals a transform information in the coded representation.

20 Claims, 31 Drawing Sheets

Related U.S. Application Data continuation of application No. PCT/IB2019/056948, filed on Aug. 16, 2019.

(51) Int. Cl.
  H04N 19/176 (2014.01)
  H04N 19/625 (2014.01)
  H04N 19/70 (2014.01)
  H04N 19/136 (2014.01)
  H04N 19/60 (2014.01)

(56) References Cited

U.S. PATENT DOCUMENTS

| | | | |
|---|---|---|---|
| 2013/0114730 A1 | 5/2013 | Joshi et al. | |
| 2016/0219290 A1 | 7/2016 | Zhao et al. | |
| 2016/0353112 A1* | 12/2016 | Zhang | H04N 19/174 |
| 2017/0332099 A1 | 11/2017 | Lee et al. | |
| 2018/0020218 A1* | 1/2018 | Zhao | H04N 19/61 |
| 2018/0103252 A1 | 4/2018 | Hsieh et al. | |
| 2019/0387241 A1* | 12/2019 | Kim | H04N 19/147 |
| 2021/0014534 A1 | 1/2021 | Koo et al. | |
| 2021/0021870 A1 | 1/2021 | Tsukuba | |
| 2021/0076038 A1 | 3/2021 | Zhang et al. | |
| 2021/0076043 A1 | 3/2021 | Zhang et al. | |

FOREIGN PATENT DOCUMENTS

| | | |
|---|---|---|
| CN | 103329529 A | 9/2013 |
| CN | 107211144 A | 9/2017 |
| CN | 108322760 A | 7/2018 |
| JP | 2014535247 A | 12/2014 |
| JP | 2018506905 A | 3/2018 |
| KR | 10-2017-0107452 A | 9/2017 |
| WO | 2016123091 A1 | 8/2016 |
| WO | 2017195555 A1 | 11/2017 |
| WO | 2018061837 A1 | 4/2018 |
| WO | 2018143670 A1 | 8/2018 |
| WO | 2019188466 A1 | 10/2019 |

OTHER PUBLICATIONS

Akula et al. "Description of SDR, HDR and 360 degree Video Coding Technology Proposal Considering Mobile Application Scenario by Samsung, Huawei, GoPro, and HiSilicon," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
ITU-T H.265 "High efficiency video coding" Series H: Audiovisual and Multimedia Systems Infrastructure of audiovisual services—Coding of moving video,Telecommunication Standardization Sector of ITU, Available at address: https://www.itu.int/rec/T-REC-H.265 (Nov. 2019).
JEM-7.0: https://jvet.hhi.fraunhofer.de/svn/svn_HMJEMSoftware/tags/ HM-16.6-JEM-7.0.
Lin et al. "Simplified Multiple-Core Trasform for Intra Residual Coding," Joint Video Exploration Team (JVET) of ITU-T SG 16 WP 3 and ISO/IEC JTC 1/SC 29/WG 11, 11th Meeting, Ljubljana, SI, Jul. 10-20, 2018, document JVET-K0126, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.
Sole et al. "Transform Coefficient Coding in HEVC," 2012 Picture Coding Symposium (PCS 2012), Krakow Poland, May 7-9, 2012, [Proceedings], IEEE, Piscataway, NJ, 2012, pp. 461-464.
Zhao et al. "NSST: Non-Separable Secondary Transforms for Next Generation Video Coding," 2016 Picture Coding Symposium (PCS), IEEE, Dec. 4, 2016, pp. 1-5.
International Search Report and Written Opinion from International Patent Application No. PCT/IB2019/056945 dated Jan. 26, 2020 (22 pages).
International Search Report and Written Opinion from International Patent Application No. PCT/IB2019/056948 dated Dec. 11, 2019 (20 pages).
Office Action from Indian Patent Application No. 202147004528 dated Jan. 12, 2022.
Non-Final Office Action from U.S. Appl. No. 17/102,219 dated Jan. 26, 2021.
Chiang et al. "CE6.1.10 & CE6.3.4: AMT Simplification and Improvement," Joint Video Experts Team (JVET) of ITU-T SG 16 WP3 and ISO/IEC JTC 1/SC 29/WG 11 11th Meeting, Ljubljana, SI, Jul. 10-18, 2018 document JVET-K0250, 2018. (cited in CN201910760271.X OA1 dated Jun. 14, 2022).
Hsu et al. "Description of SDR Video Coding Technology proposal by MediaTek," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0018, 2018. (cited in JP2021-506751 OA1 dated Jun. 21, 2022).
Zhang et al. "CE6 related: On Index Signalling of Multiple Transform Selection," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0331, 2018. (cited in JP2021-506751 OA1 dated Jun. 21, 2022).

* cited by examiner

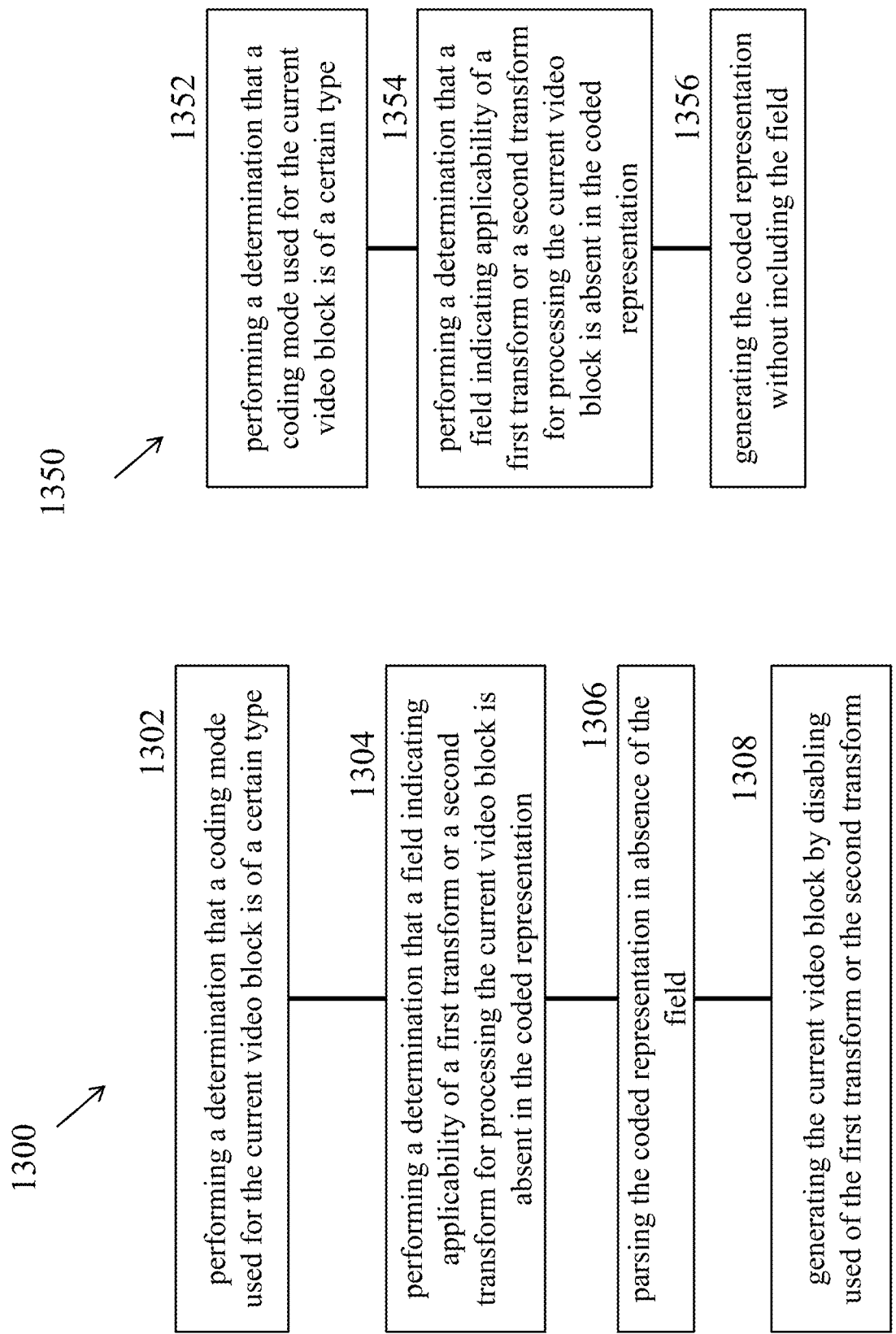

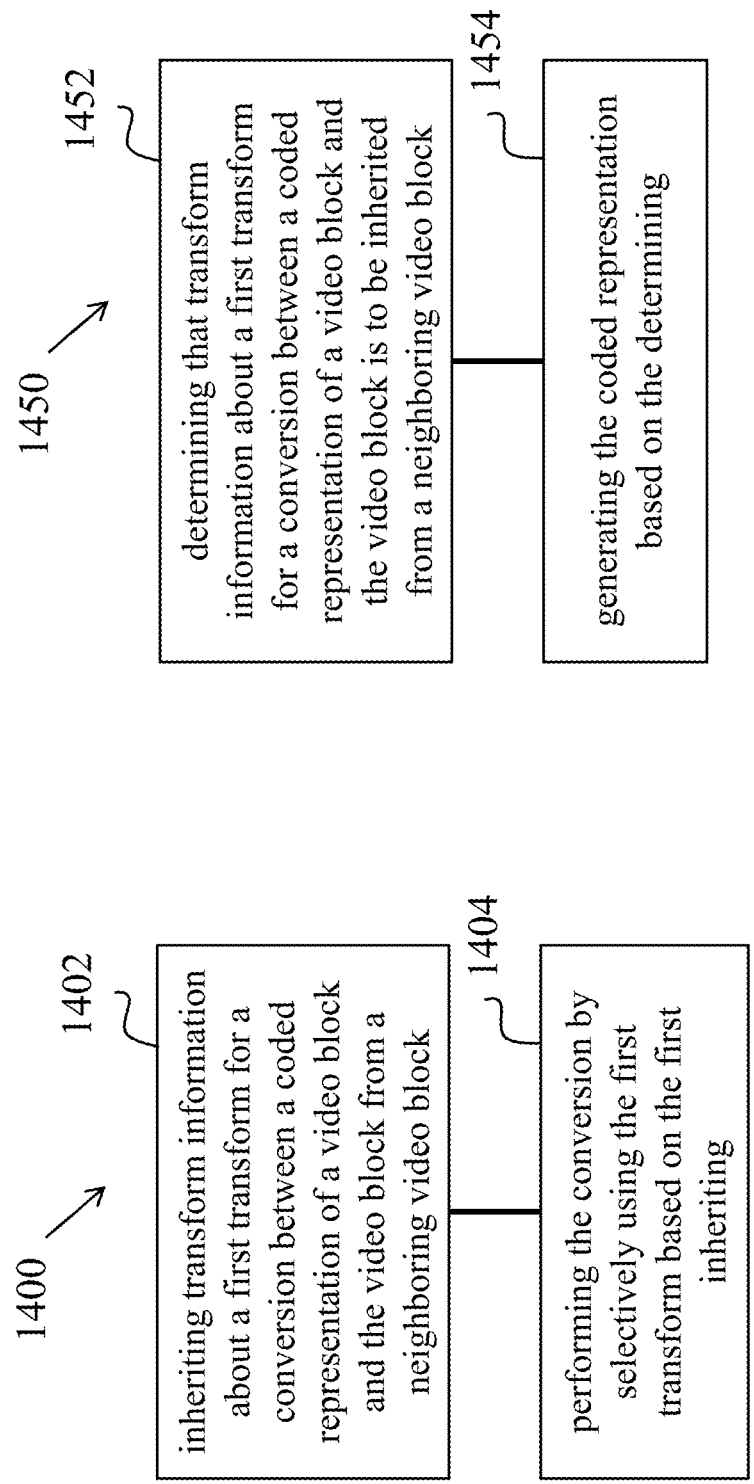

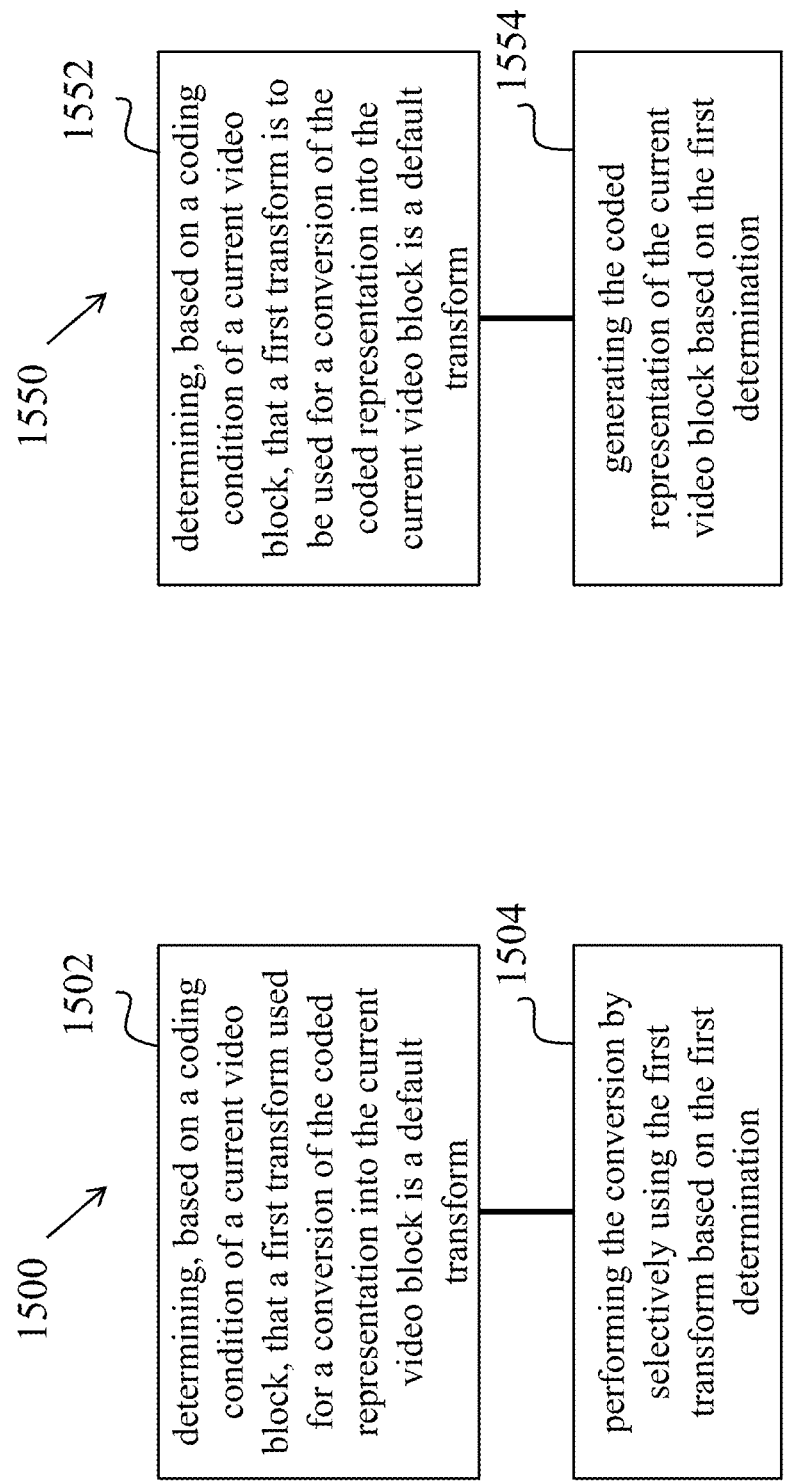

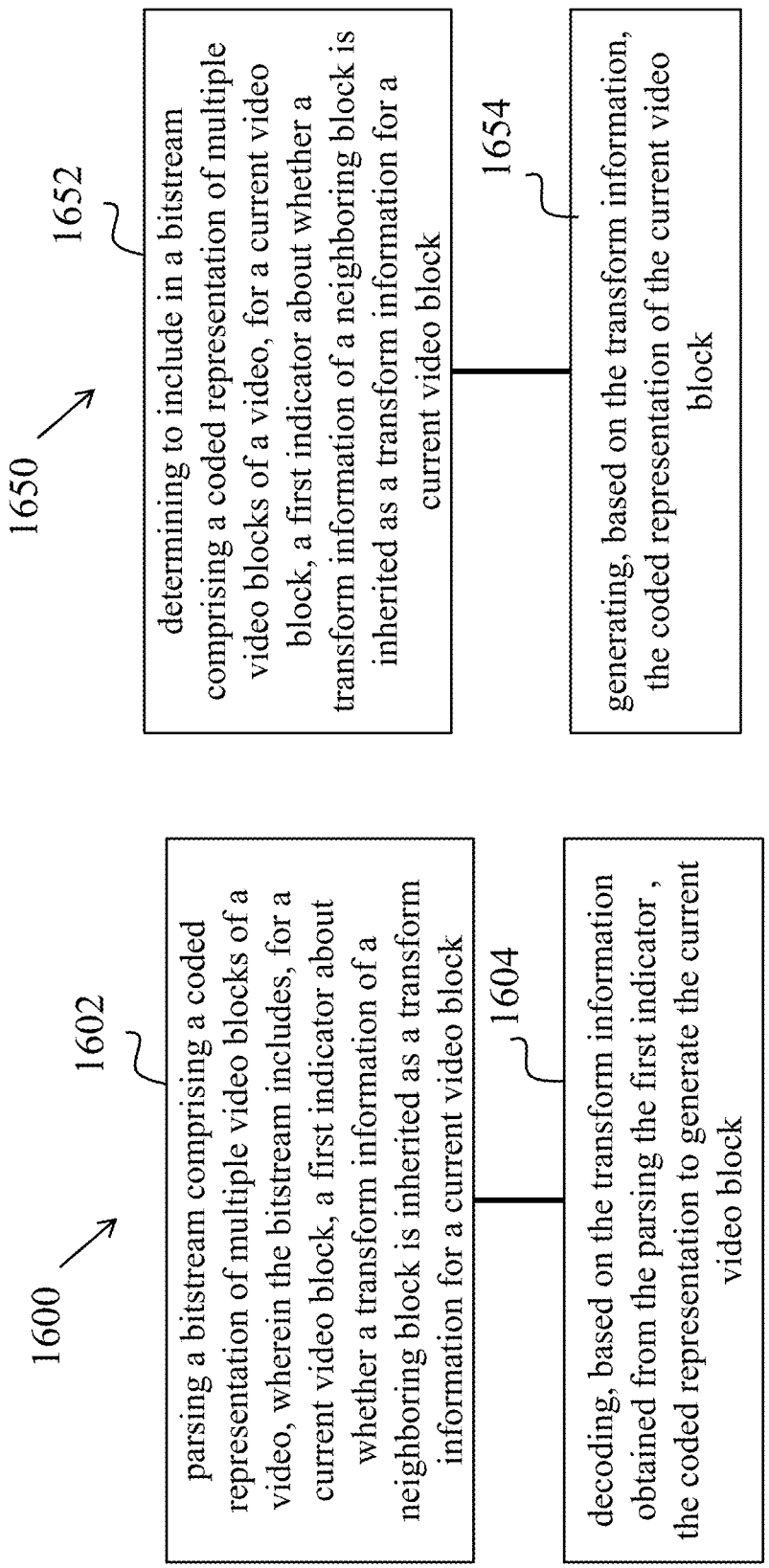

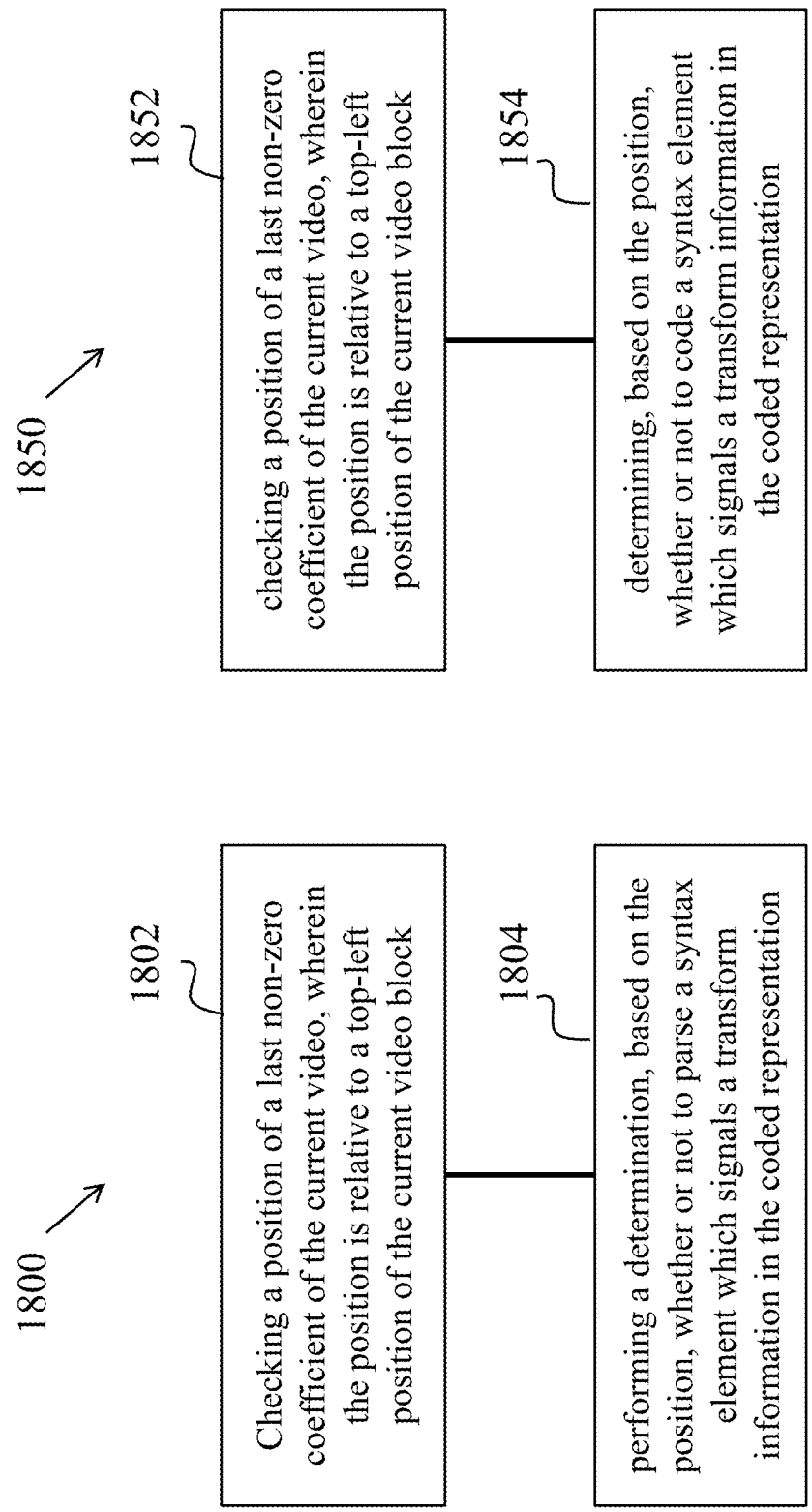

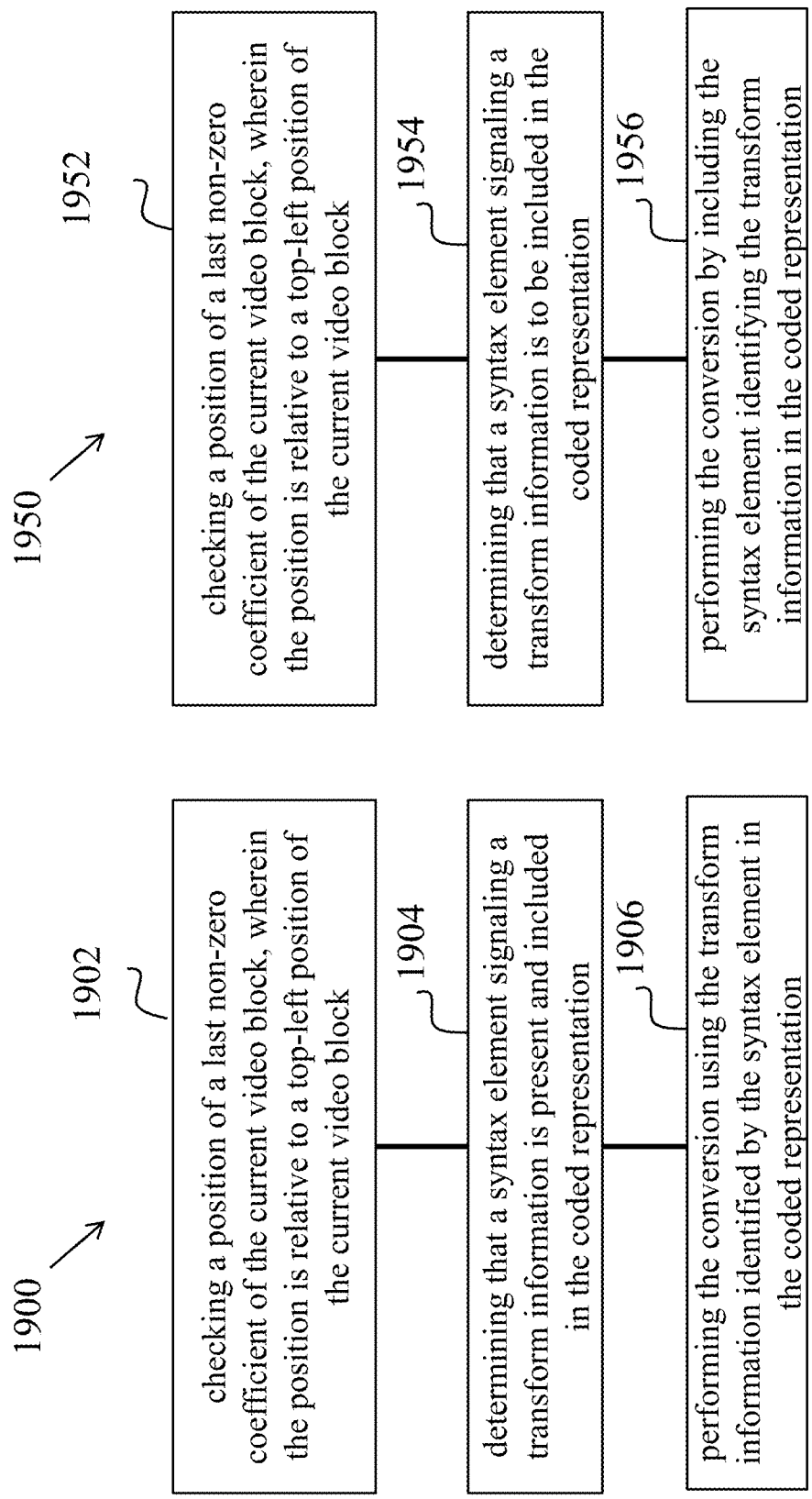

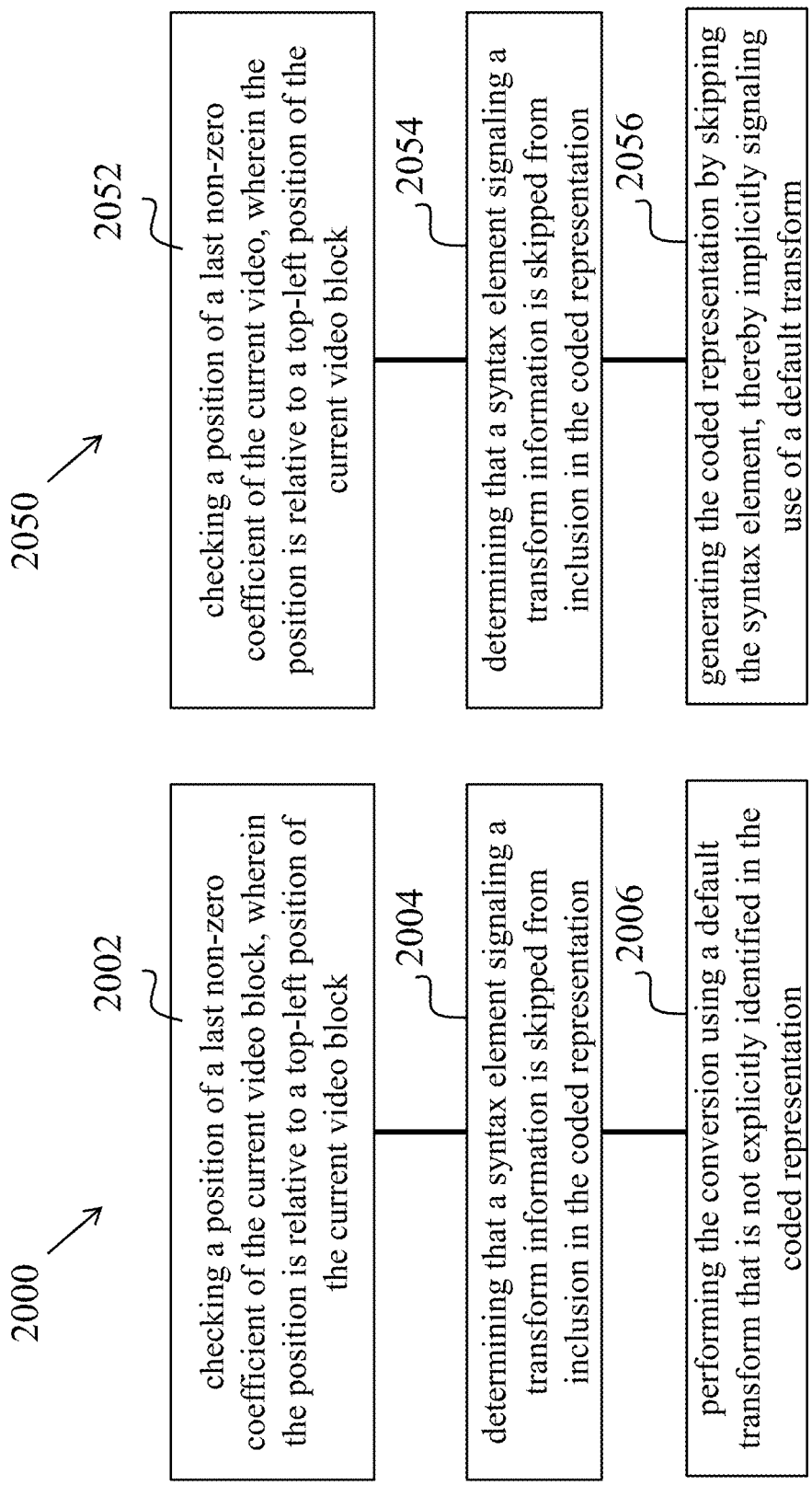

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

FIG. 31

COEFFICIENT DEPENDENT CODING OF TRANSFORM MATRIX SELECTION

CROSS REFERENCE TO RELATED APPLICATIONS

This application is a continuation of U.S. application Ser. No. 17/102,219, filed on Nov. 23, 2020, which is a continuation of International Patent Application No. PCT/IB2019/056948, filed on Aug. 16, 2019, which claims the priority to and benefits of International Patent Application No. PCT/CN2018/100795, filed on Aug. 16, 2018. All the aforementioned patent applications are hereby incorporated by reference in their entireties.

TECHNICAL FIELD

This patent document relates to video encoding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding and decoding, and specifically, multiple transform selection (MTS) in video coded operations are described. The described methods may be applied to both the existing video coding standards (e.g., High Efficiency Video Coding (HEVC)) and future video coding standards (e.g., Versatile Video Coding (VVC)) or codecs.

In one example aspect, a method of video processing is disclosed. The method includes parsing a first field in a coded representation of a video for a first determination of applicability of a first transform for a conversion of the coded representation into a video block and performing the conversion by selectively using the first transform based on the first determination. During the conversion, the first transform is applied to a result of dequantized residual coefficient values of the video block.

In another example aspect, a method of video processing disclosed. The method includes performing a determination, for a conversion between a current video block of a video and a coded representation of the video, that a coding mode used for the current video block is of a certain type; performing a determination, as a result of the coding mode being of the certain type, that a field indicating applicability of a first transform or a second transform for processing the current video block is absent in the coded representation; parsing the coded representation in absence of the field; and generating the current video block by disabling used of the first transform or the second transform for transforming dequantized residual coefficients of the current video block due to the determination.

In another example aspect, a method of video processing disclosed. The method includes inheriting transform information about a first transform for a conversion between a coded representation of a video block and the video block from a neighboring video block, wherein, during the conversion, the first transform is applied to a result of dequantized residual coefficient values of the video block; and performing the conversion by selectively using the first transform based on the first inheriting.

In another example aspect, a method of video processing disclosed. The method includes determining, based on a coding condition of a current video block, that a first transform used for a conversion of the coded representation into the current video block is a default transform, wherein, during the conversion, the first transform is applied to a result of dequantized residual coefficient values of the current video block; and performing the conversion by selectively using the first transform based on the first determination.

In another example aspect, a method of video processing disclosed. The method includes parsing a bitstream comprising a coded representation of multiple video blocks of a video, wherein the bitstream includes, for a current video block, a first indicator about whether a transform information of a neighboring block is inherited as a transform information for a current video block and decoding, based on the transform information obtained from the parsing the first indicator, the coded representation to generate the current video block, wherein, during the conversion, a transform identified by the transform information is applied to a result of dequantized residual coefficient values of the current video block.

In another example aspect, a method of video processing disclosed. The method includes including a first field in a coded representation of a video for a first determination of applicability of a first transform for a conversion of the coded representation into a video block, wherein, during the conversion, the first transform is to be applied to a result of dequantized residual coefficient values of the video block; and generating the coded representation by encoding the video block.

In another example aspect, a method of video processing disclosed. The method includes performing a determination, for a conversion between a current video block of a video and a coded representation of the video, that a coding mode used for the current video block is of a certain type; performing a determination, as a result of the coding mode being of the certain type, that a field indicating applicability of a first transform or a second transform for processing the current video block is not to be included the coded representation; and generating the coded representation without including the field; wherein the current video block is decodable by disabling used of the first transform and/or the second transform for transforming dequantized residual coefficients of the current video block due to the determination.

In another example aspect, a method of video processing disclosed. The method includes determining that transform information about a first transform for a conversion between a coded representation of a video block and the video block is to be inherited from a neighboring video block, wherein, during the conversion, the first transform is applied to a result of dequantized residual coefficient values of the video block; and generating the coded representation based on the determining.

In another example aspect, a method of video processing disclosed. The method includes determining, based on a coding condition of a current video block, that a first transform is to be used for a conversion of the coded representation into the current video block is a default transform, wherein, during the conversion, the first transform is applied to a result of dequantized residual coefficient values of the current video block; and generating the coded representation of the current video block based on the first determination.

In another example aspect, a method of video processing disclosed. The method includes determining to include in a bitstream comprising a coded representation of multiple video blocks of a video, for a current video block, a first indicator about whether a transform information of a neighboring block is inherited as a transform information for a current video block; and generating, based on the transform information, the coded representation of the current video block; wherein, during decoding, a transform identified by the transform information is to be applied to a result of dequantized residual coefficient values of the current video block.

In another example aspect, a method of video processing disclosed. The method includes determining to include a bitstream comprising a coded representation of multiple video blocks of a video, for a current video block that is coded using a merge mode, a one-bit field indicating a first indication for using, as a transform, a default transform, and a second indication for using an index identifying the transform included in the coded representation; and generating the coded representation in which the transform is identified by the one-bit field.

In another example aspect, a method of video processing disclosed. The method includes checking, during a conversion from a coded representation of a current video block to the current video block, a position of a last non-zero coefficient of the current video block, wherein the position is relative to a top-left position of the current video block; and performing a determination, based on the position, whether or not to parse a syntax element which signals a transform information in the coded representation.

In another example aspect, a method of video processing disclosed. The method includes checking, during conversion from a coded representation of a current video block to the current video block, a position of a last non-zero coefficient of the current video block, wherein the position is relative to a top-left position of the current video block; determining, due to the position and at least one other coding criterion satisfying a condition, that a syntax element signaling a transform information is present and included in the coded representation; and performing the conversion using the transform information identified by the syntax element in the coded representation.

In another example aspect, a method of video processing disclosed. The method includes checking, during a conversion from a coded representation of a current video block to the current video block, a position of a last non-zero coefficient of the current video block, wherein the position is relative to a top-left position of the current video block; determining due to the position and/or at least one other coding criterion failing to satisfy a condition, that a syntax element signaling a transform information is skipped from inclusion in the coded representation; and performing the conversion using a default transform that is not explicitly identified in the coded representation.

In another example aspect, a method of video processing disclosed. The method includes checking, during a conversion of a current video block to a coded representation of the current video block, a position of a last non-zero coefficient of the current video block, wherein the position is relative to a top-left position of the current video block; and determining, based on the position, whether or not to code a syntax element which signals a transform information in the coded representation.

In another example aspect, a method of video processing disclosed. The method includes checking, during conversion from a coded representation of a current video block to the current video block, a position of a last non-zero coefficient of the current video block, wherein the position is relative to a top-left position of the current video block; determining, due to the position and at least one other coding criterion satisfying a condition, that a syntax element signaling a transform information is to be included in the coded representation; and performing the conversion by including the syntax element identifying the transform information in the coded representation.

In another example aspect, a method of video processing disclosed. The method includes checking, during a conversion from a coded representation of a current video block to the current video block, a position of a last non-zero coefficient of the current video block, wherein the position is relative to a top-left position of the current video block; determining due to the position and/or at least one other coding criterion failing to satisfy a condition, that a syntax element signaling a transform information is skipped from inclusion in the coded representation; and generating the coded representation by skipping the syntax element, thereby implicitly signaling use of a default transform.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 13A and 13B show flowcharts for examples of video processing methods.

FIGS. 14A and 14B show flowcharts for examples of video processing methods.

FIGS. 15A and 15B show flowcharts for examples of video processing methods.

FIGS. 16A and 16B show flowcharts for examples of video processing methods.

FIGS. 18A and 18B show flowcharts for examples of video processing methods.

FIGS. 19A and 19B show flowcharts for examples of video processing methods.

FIGS. 20A and 20B show flowcharts for examples of video processing methods.

FIG. 31 shows an example mapping between intra prediction modes to transform sets.

DETAILED DESCRIPTION

Figure 1:
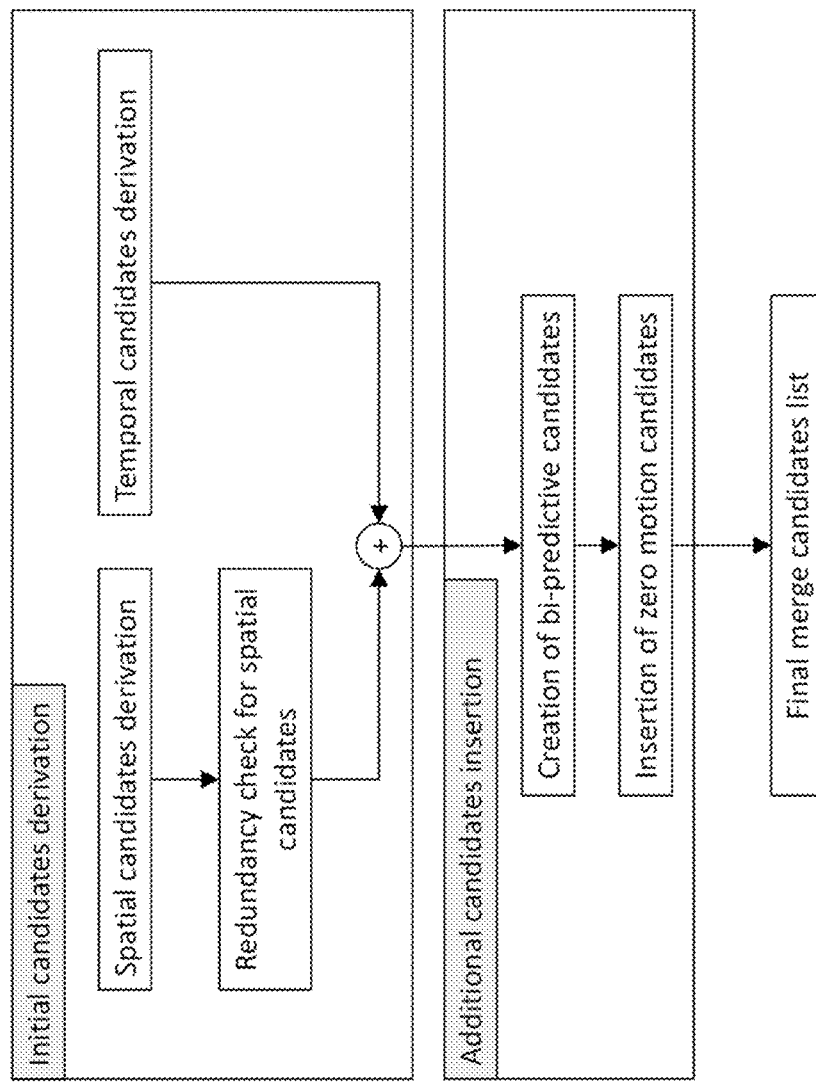
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a coding unit (CU) is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
    Step 2: Additional candidates insertion
    Step 2.1: Creation of bi-predictive candidates
    Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
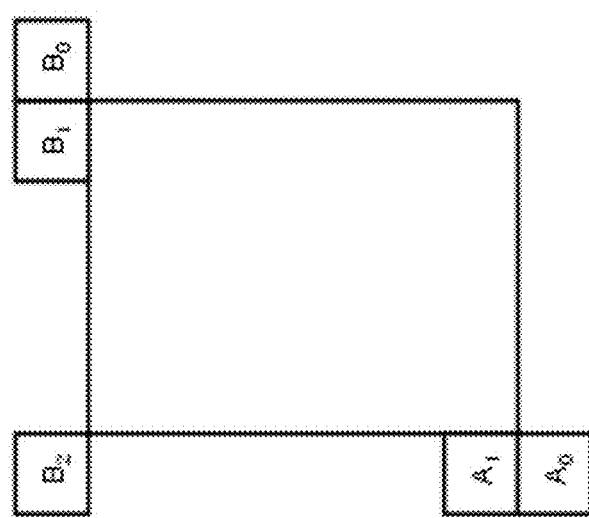
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
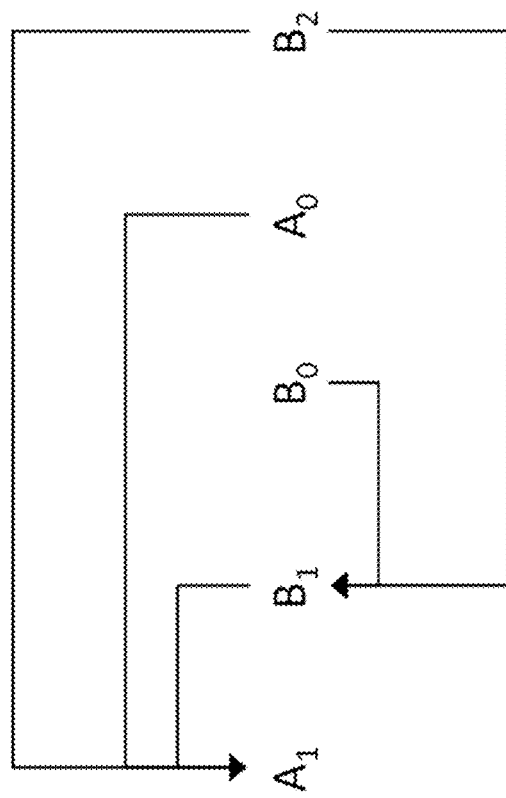
FIG. 3 shows an example of candidate pairs subject to a redundancy check of spatial merge candidates.
Figure 4B:
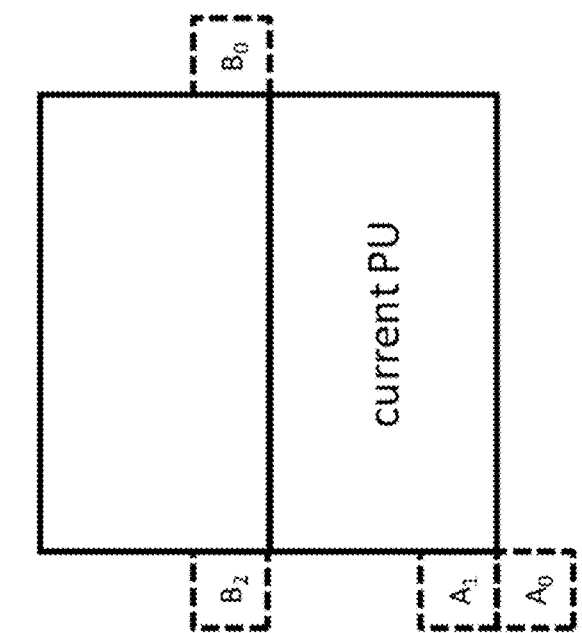
FIGS. 4A and 4B show examples of the position of a second prediction unit (PU) based on the size and shape of the current block.
Figure 4A:
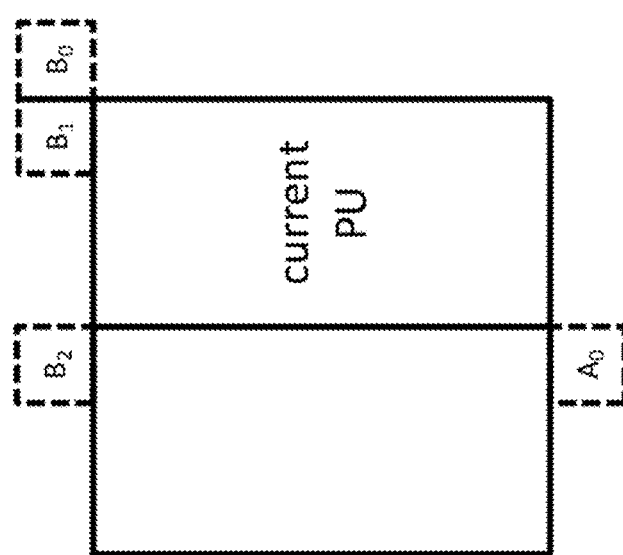

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
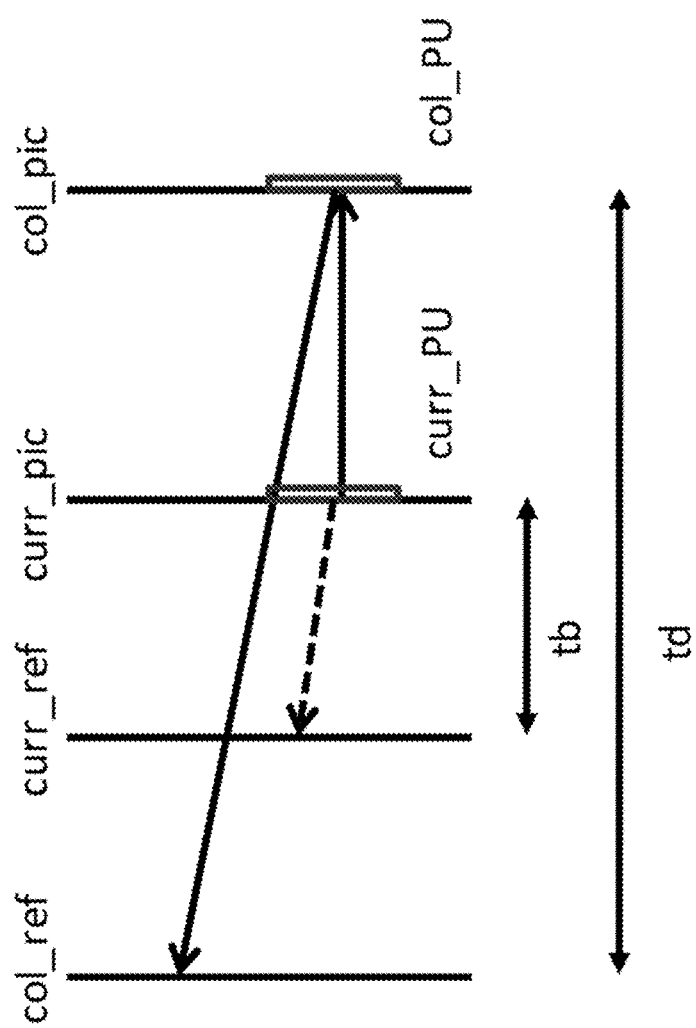
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
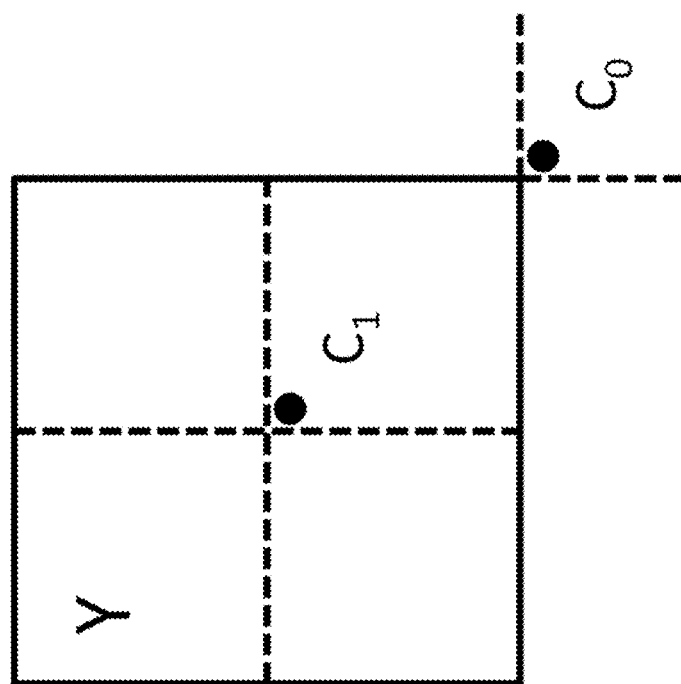
FIG. 6 shows an example of candidate positions for temporal merge candidates.

In the co-located PU (Y) belonging to the reference frame, the position for the temporal candidate is selected between candidates Co and Ci, as depicted in FIG. 6. If PU at position Co is not available, is intra coded, or is outside of the current CTU, position Ci is used. Otherwise, position Co is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
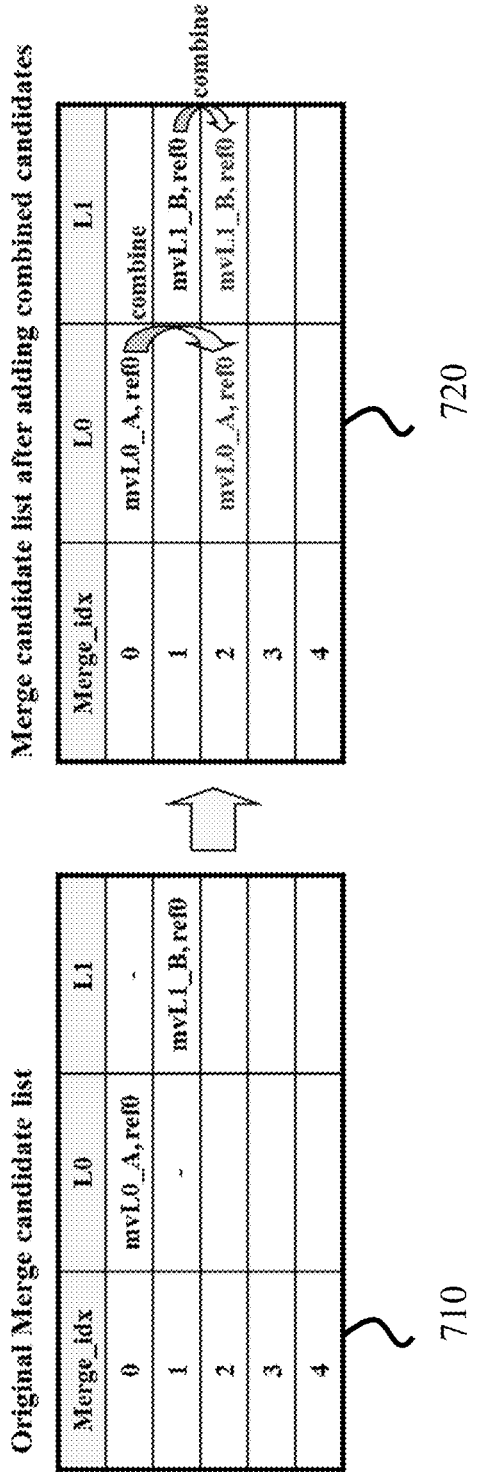
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP coding mode exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
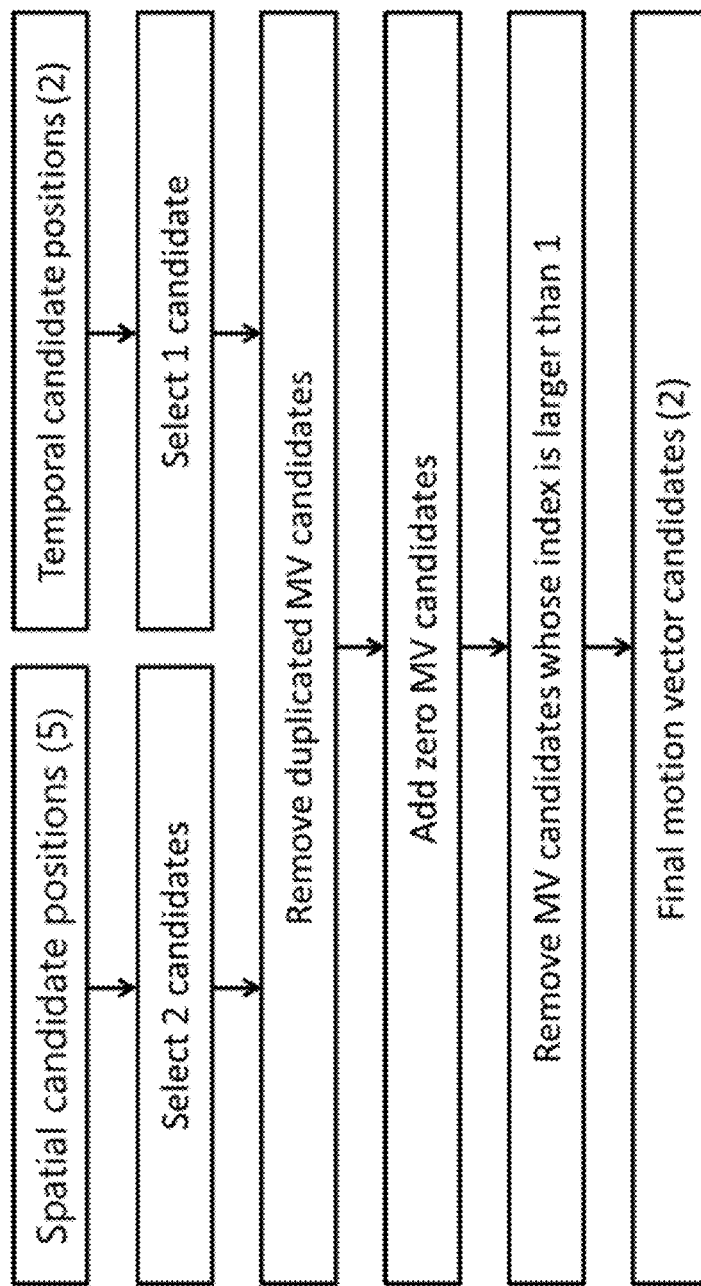
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
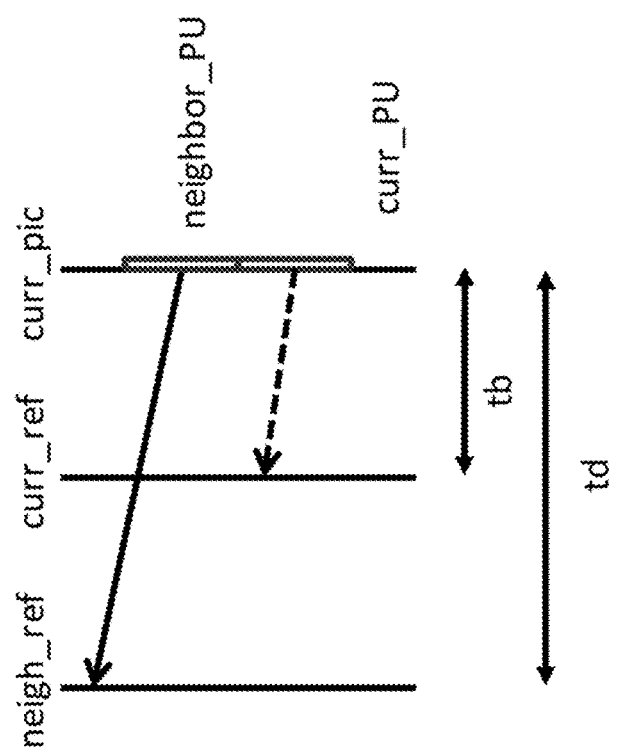
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
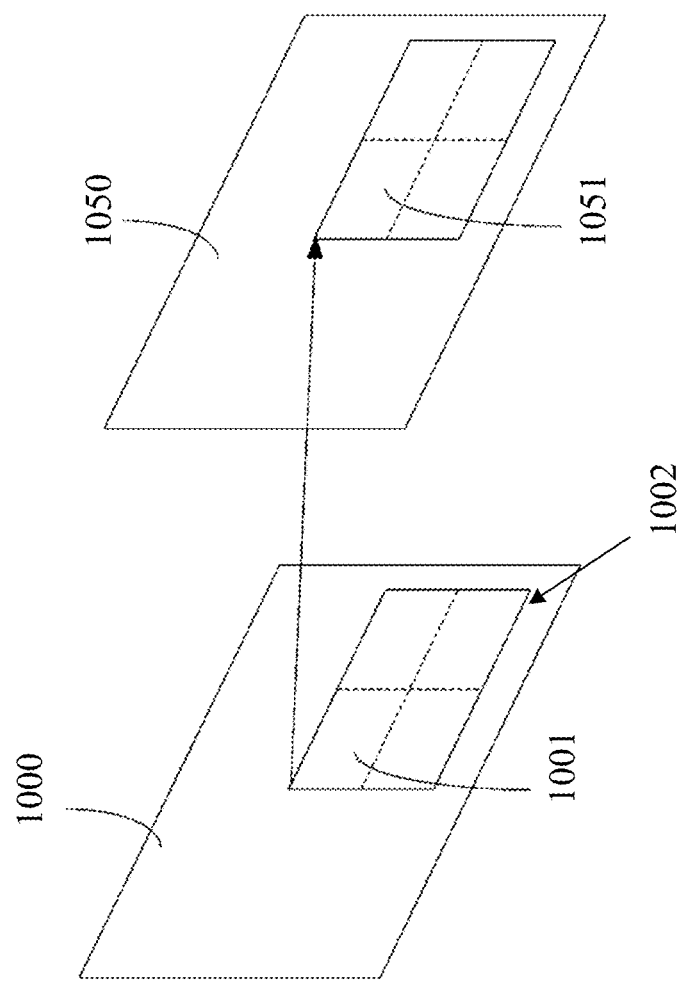
FIG. 10 shows an example of motion prediction using the alternative temporal motion vector prediction (ATMVP) algorithm for a coding unit (CU).

FIG. 10 shows an example of ATMVP motion prediction process for a CU in a current picture 1000. The ATMVP method predicts the motion vectors of the sub-CUs 1001 within a CU 1002 in two steps. The first step is to identify the corresponding block 1051 in a reference picture 1050 with a temporal vector. The reference picture 1050 is also referred to as the motion source picture. The second step is to split the current CU 1002 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1002. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
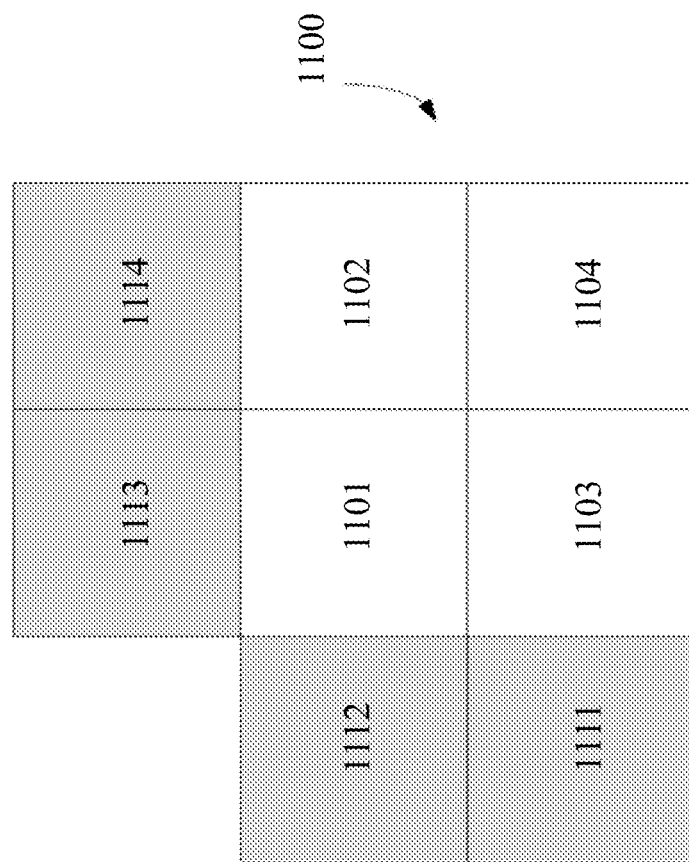
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to $1/16$ pel. The higher motion vector accuracy ($1/16$ pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is $1/32$ sample in the JEM, the additional interpolation filters of $1/32$ pel fractional positions are derived by using the average of the filters of the two neighbouring $1/16$ pel fractional positions.

3. Examples of Transform Design in JEM

There are two different kinds of transforms in JEM; one is called adaptive multiple core transform (AMT, also known as, Multiple Transform Selection (MTS)) which is also treated as the primary transform, and the other one is called non-separable secondary transform (NSST, also known as Low Frequency Non-Separable Transform).

3.1 Examples of the Adaptive Multiple Core Transform (AMT)

In addition to (Discrete Cosine Transform) DCT-II and 4×4 (discrete sine transform) DST-VII which have been employed in HEVC, an adaptive multiple (core) transform (AMT) scheme is used for residual coding for both inter and intra coded blocks. It uses multiple selected transforms from the DCT/DST families other than the current transforms in HEVC. The newly introduced transform matrices are DST-VII, DCT-VIII, DST-I and DCT-V. Table 1 shows the basis functions of the selected DST/DCT.

TABLE 1

Transform basis functions of DCT-II/V/VIII and DST-I/VII for N-point input

| Transform Type | Basic function $T_i(j)$, i, j = 0, 1, . . . , N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the range of 16-bit, after horizontal and after vertical transform, all the coefficients are right shifted by 2 more bits, comparing to the right shift used in the current HEVC transforms.

The AMT applies to the CUs with both width and height smaller than or equal to 64, and whether AMT applies or not is controlled by a CU level flag. When the CU level flag (i.e., AMT flag) is equal to 0, DCT-II is applied in the CU to encode the residue. For luma coding block within an AMT enabled CU, two additional flags (e.g., AMT indices) are signalled to identify the horizontal and vertical transform to be used. As in HEVC, the residual of a block can be coded with transform skip mode in the JEM. To avoid the redundancy of syntax coding, the transform skip flag is not signalled when the CU level AMT flag is not equal to zero.

For intra residue coding, due to the different residual statistics of different intra prediction modes, a mode-dependent transform candidate selection process is used. Three transform subsets have been defined as shown in Table 2, and the transform subset is selected based on the intra prediction mode, as specified in Table 3.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the subset concept, a transform subset is first identified based on Table 2 using the intra prediction mode of a CU with the CU-level AMT flag is equal to 1. After that, for each of the horizontal and vertical transform, one of the two transform candidates in the identified transform subset, according to Table 3, is selected based on explicitly signalled with flags.

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

For inter prediction residual, however, only one transform set, which consists of DST-VII and DCT-VIII, is used for all inter modes and for both horizontal and vertical transforms.

The complexity of AMT would be relatively high at the encoder side, since totally five (DCT-II and four multiple transform candidates) different transform candidates need to be evaluated with rate-distortion cost for each residual block when brute-force search is used. To alleviate this complexity issue at the encoder, several optimization methods are designed for algorithm acceleration in the JEM.

Figures 21A, 21B:
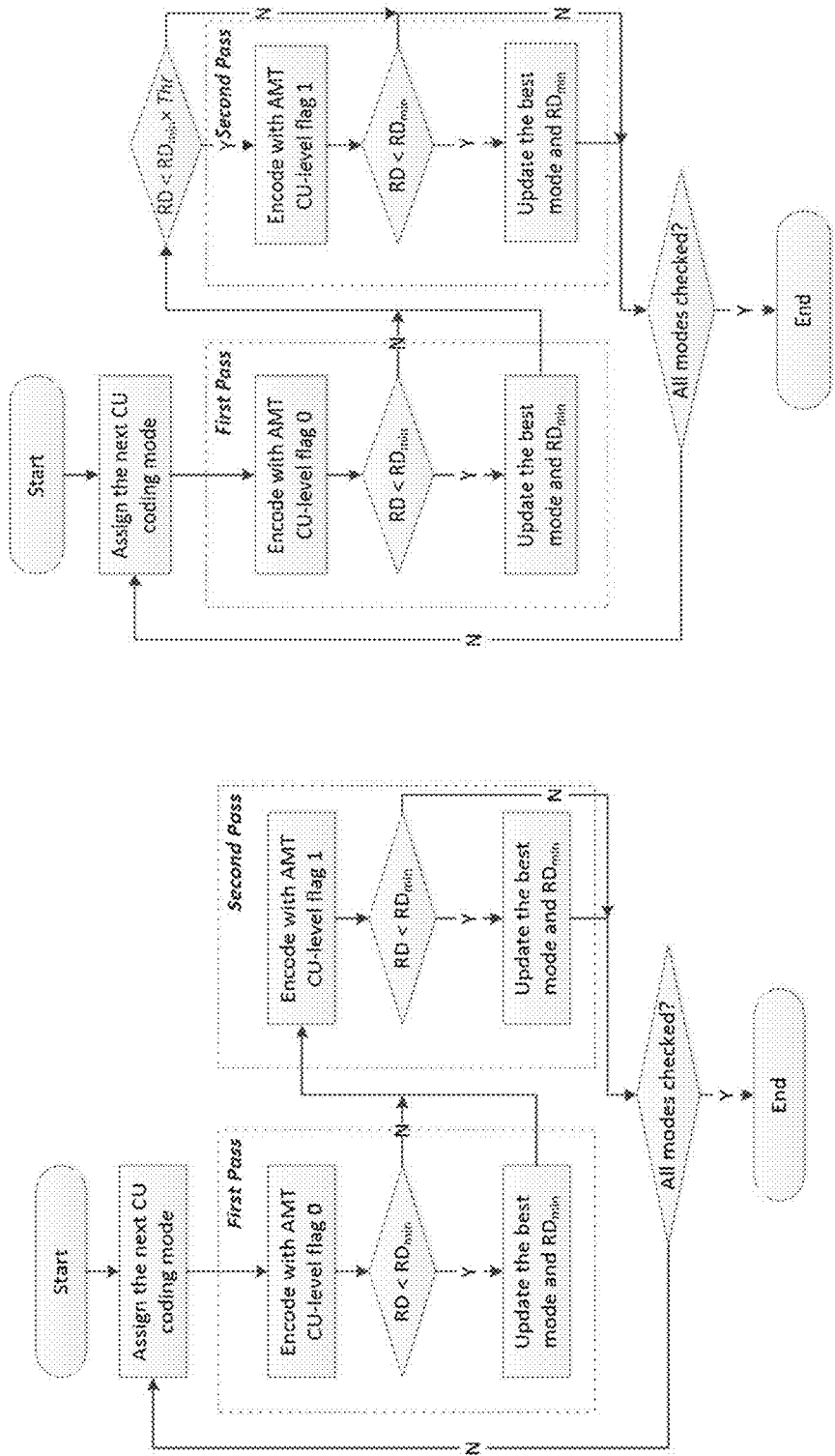
FIGS. 21A and 21B show exemplary flowcharts for the CU encoding process using adaptive multiple core transforms (AMT, also known as multiple transform selection (MTS)) without and with the fast algorithms, respectively.

At the the encoder, for each CU-level coding mode, two-pass coding is applied. As shown in FIG. 21A, the first pass examines the R-D cost of applying only DCT-II for the CU (CU level flag is 0), while the second pass further examines the R-D cost of applying multiple transforms for the CU (CU level flag is 1). In addition, it is observed that the CU-level coding mode is relatively consistent no matter which pass is actually applied. Therefore, when checking the multi-transform pass for the CU, the statistics of applying only DCT-II is collected and are used to skip unnecessary R-D calculations in the second multi-transform pass. As shown in FIG. 21B, when the R-D cost of a certain CU coding mode with AMT CU-level flag 0 exceeds the minimum R-D cost of a certain threshold, as indicated by the condition highlighted in FIG. 21B, the second pass, i.e., encode the CU with the current CU coding mode with AMT CU-level flag 1, is skipped.

3.2 Mode-Dependent Non-Separable Secondary Transforms (NSST)

In the JEM, a mode-dependent non-separable secondary transform (MDNSST) is applied between the forward core transform and quantization (at the encoder) and between the de-quantization and inverse core transform (at the decoder). To keep low complexity, MDNSST is only applied to the low frequency coefficients after the primary transform. If both width (W) and height (H) of a transform coefficient block is larger than or equal to 8, then 8×8 non-separable secondary transform is applied to the top-left 8×8 region of the transform coefficients block. Otherwise, if either W or H of a transform coefficient block is equal to 4, a 4×4 non-separable secondary transform is applied and the 4×4 non-separable transform is performed on the top-left min(8,W)× min(8,H) region of the transform coefficient block. The above transform selection rule is applied for both luma and chroma components.

Matrix multiplication implementation of a non-separable transform is described as follows using a 4×4 input block as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. In the JEM, a Hypercube-Givens Transform (HyGT) with butterfly implementation is used instead of matrix multiplication to reduce the complexity of non-separable transform.

3.2.1 Mode-Dependent Transform Core Selection

There are totally 35×3 non-separable secondary transforms for both 4×4 and 8×8 block size, where 35 is the number of transform sets specified by the intra prediction mode, denoted as set, and 3 is the number of NSST candidate for each intra prediction mode. The mapping from the intra prediction mode to the transform set is defined in Table 4 shown in FIG. 31. The transform set applied to luma/chroma transform coefficients is specified by the corresponding luma/chroma intra prediction modes, according to Table 4. For intra prediction modes larger than 34 (diagonal prediction direction), the transform coefficient block is transposed before/after the secondary transform at the encoder/decoder.

For each transform set, the selected non-separable secondary transform candidate is further specified by the explicitly signalled CU-level MDNSST index. The index is signalled in a bitstream once per intra CU after transform coefficients and truncated unary binarization is used. The truncated value is 2 in case of planar or DC mode, and 3 for angular intra prediction mode. This MDNSST index is signalled only when there is more than one non-zero coefficient in a CU. The default value is zero when it is not signalled. Zero value of this syntax element indicates secondary transform is not applied to the current CU, values 1-3 indicates which secondary transform from the set should be applied.

In the JEM, MDNSST is not applied for a block coded with transform skip mode. When the MDNSST index is signalled for a CU and not equal to zero, MDNSST is not used for a block of a component that is coded with transform skip mode in the CU. When a CU with blocks of all components are coded in transform skip mode or the number of non-zero coefficients of non-transform-skip mode CBs is less than 2, the MDNSST index is not signalled for the CU.

In the JEM, MDNSST also has impact on how mode dependent reference samples intra smoothing (MDIS) is applied when intra prediction is generated. MDIS is disabled (i.e. no reference samples smoothing) for a block when its MDNSST index is zero. A HEVC-style MDIS is applied for a block when its MDNSST index is not equal to zero. This rule is applied for all intra prediction modes except planar mode, where PDPC process is applied. In the JEM, the strong intra smoothing, which is applied for 32×32 intra block size in HEVC, is disabled.

At the encoder side, CU level RD checks are used to select the NSST index for a CU. That is, for an intra-coded CU, the CU level RD check is looped four times by using NSST index value as loop index. To accelerate encoder speed, the following fast methods are used:

Early stopping of the loop is applied. The RD check for a NSST index with larger value is skipped when there is no non-zero transformed coefficients in the current CU for a NSST index with smaller value.

The intra mode decision for each of the NSST indices in the reference software comprises the rough mode decision (RMD) stage and the RDO stage. In the RMD stage, 3 out of 67 intra prediction modes are selected based on the SATD cost. This process is applied twice (one for NSST index equal to zero and one for NSST index equal to non-zero) instead of four times. For all non-zero NSST indices, the SATD costs of different NSST indices for an intra prediction mode should be the same. Therefore, RMD process only needs to be applied once (as NSST index=1) for all non-zero NSST indices, and the result are reused for the other non-zero NSST index.

3.2.2 Non-Separable Transform Based on HyGT

A Hypercube-Givens Transform (HyGT) is used in the computation of the non-separable secondary transform. The basic elements of this orthogonal transform are Givens rotations, which are defined by orthogonal matrices G(m, n, θ), which have elements defined by:

$$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise.} \end{cases}$$

Figure 22:
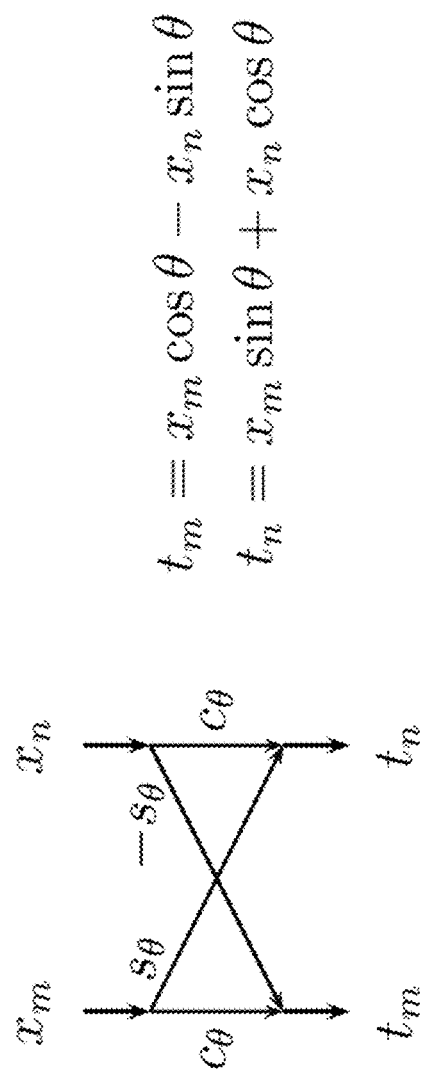
FIG. 22 shows an example of a graphical representation of a Givens rotation.

These transformations can be graphically represented as shown in FIG. 22.

Figure 23:
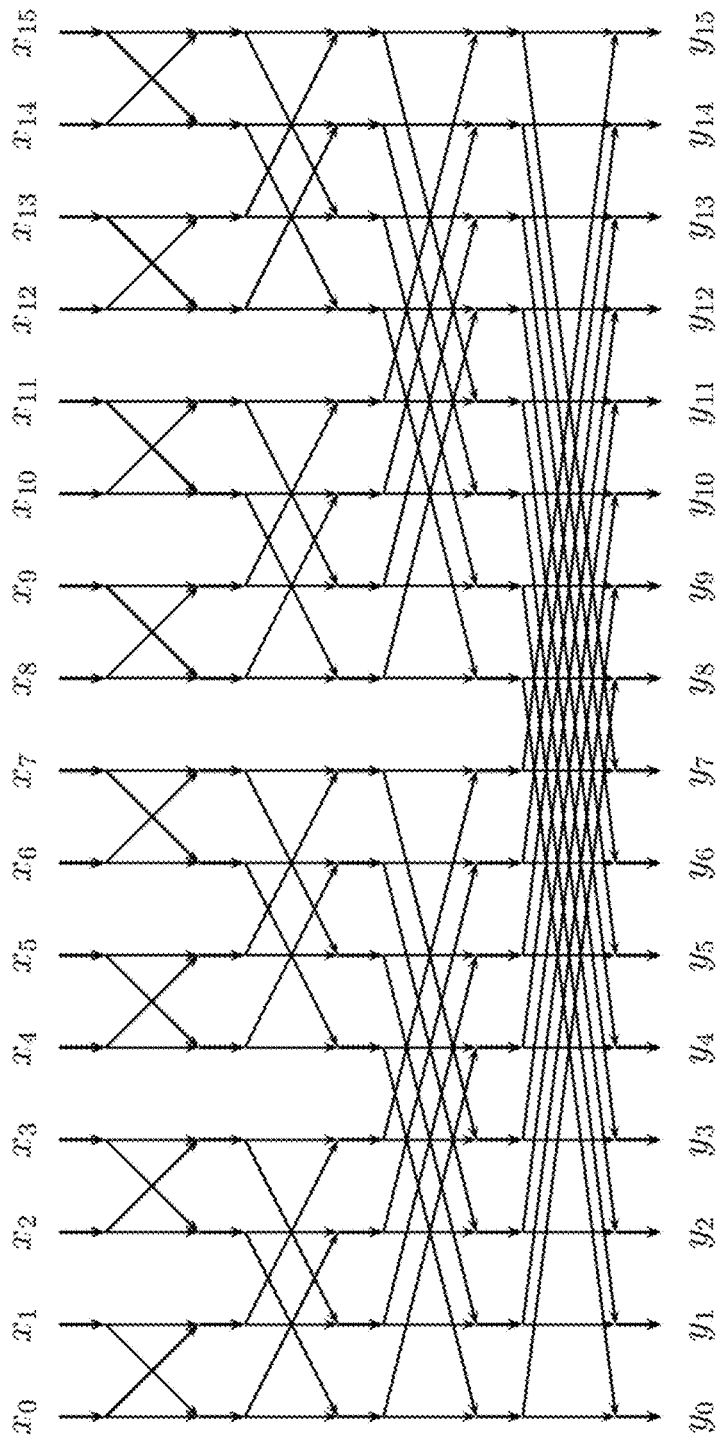
FIG. 23 shows an example of a "butterfly"-shaped flowchart of a Hypercube-Givens Transform (HyGT) for 16 elements.

HyGT is implemented by combining sets of Givens rotations in a hypercube arrangement. FIG. 23 shows the the "butterfly" shape flowchart of HyGT for 16 elements (4×4 non-separable transform). Assuming that N is a power of two, a HyGT round is defined as a sequence of log 2(N) passes, where in each pass, the indexes in vectors m and n are defined by edges of a hypercube with dimension log 2(N), sequentially in each direction.

Figure 24:
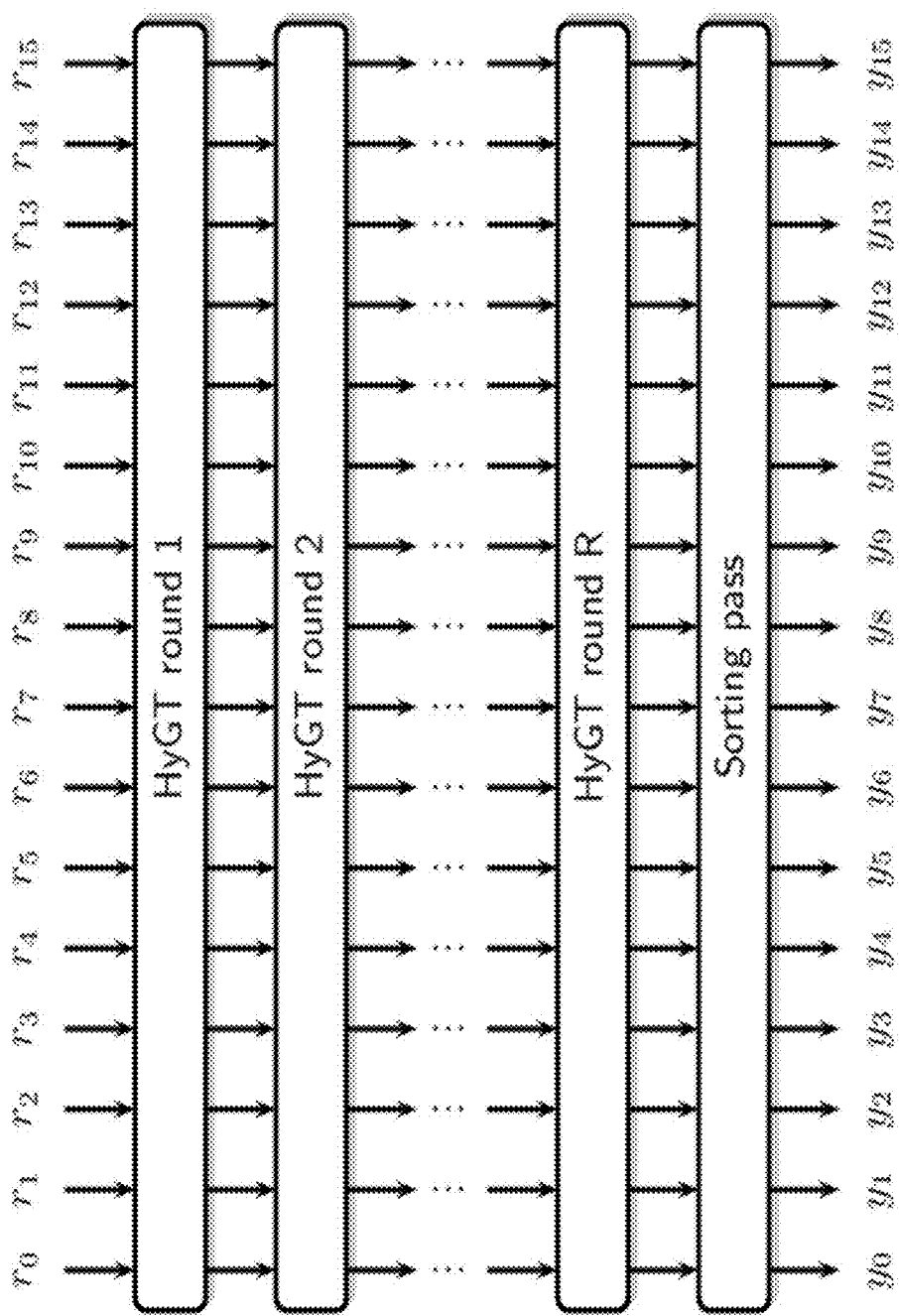
FIG. 24 shows an example of a full non-separable secondary transform composed of R rounds of HyGT and an optional permutation pass.

To obtain good compression, more than one HyGT round are used. As shown in FIG. 24, a full non-separable secondary transform is composed of R rounds HyGT, and may include an optional permutation pass, to sort transform coefficients according to their variance. In the JEM, 2-round HyGT is applied for 4×4 secondary transform and 4-round HyGT is applied for 8×8 secondary transform.

4. Examples of AMT in the VVC Test Model (VTM)

In some embodiments, including VTM version 2.0, a simplified version of AMT may include the following features:

AMT enabled for both intra and inter, each controlled by an SPS flag
No 64-length DST-VII and DCT-VIII (no AMT syntax sent when either dimension is larger than 32)
No 128-length DCT-II
Only DCT-II, DST-VII and DCT-VIII
All transforms are to have 10 bit coefficients
Conditioned on when the number of nonzero coefficients is greater than two
  for DCT2 in both directions; if not then
    Flag for horizontal is DST-VII vs. DCT-VIII
    Flag for vertical is DST-VII vs. DCT-VIII 5. Examples of Drawbacks in Existing Implementations In one existing AMT implementation, the inter AMT can provide additional ~1% gain with 171% encoding time. In another implementation, the AMT merge-only (only enabling AMT for the merge mode) could provide ~0.5% gain with 150% encoding time and AMT AMVP-only (only enabling AMT for the AMVP mode) could provide ~0.5% gain with 110% encoding time. These implementations indicate that the trade-off between complexity and coding performance of AMT merge-only may not meet future video coding requirements.

6. Example Methods for Implicit Coding for Transform Matrix Selection

Embodiments of the presently disclosed technology overcome drawbacks of existing implementations, thereby providing video coding with higher coding efficiencies but lower computational complexity. Implicit coding for transform matrix selection, based on the disclosed technology, may enhance both existing and future video coding standards, is elucidated in the following examples described for various implementations. The examples of the disclosed technology provided below explain general concepts, and are not meant to be interpreted as limiting. In an example, MTS is not limited to the design of multiple transform selection in JEM or VVC, but could refer to any other coding technology that allows a set of transforms to be selected from for encoding/decoding a block. In an example, NSST is not limited to the design of non-separable secondary transform in JEM or VVC, but could refer to any other coding technology that allows a set of secondary transforms to be selected from for encoding/decoding a block after applying a primary transform. In an example, unless explicitly indicated to the contrary, the various features described in these examples may be combined.

Example 1. In one example, to indicate the usage of MTS (or NSST), one or multiple flags may be signaled in picture parameter set/slice header/picture header, etc.

(a) In one example, a flag for a certain coded mode may be signaled to indicate whether MTS (or NSST) is enabled for this mode.

(b) In one example, one flag may be signaled to indicate whether MTS (or NSST) is enabled for intra-coded blocks.

(c) In one example, one flag may be signaled to indicate whether MTS (or NSST) is enabled for inter-coded blocks.

(d) In one example, one flag may be signaled to indicate whether MTS (or NSST) is enabled for AMVP-coded blocks (which may include or exclude affine inter mode).

(e) In one example, one flag may be signaled to indicate whether MTS (or NSST) is enabled for merge-coded blocks (which may include or exclude affine merge mode).

(f) In one example, one flag may be signaled to indicate whether MTS (or NSST) is enabled for sub-block-based prediction, such as affine mode or ATMVP mode.

Example 2. In one example, MTS (or NSST) may be always disabled for certain modes without being signaled.

(a) In one example, MTS is disabled for AMVP-coded blocks (which may include or exclude affine inter mode).

(b) In one example, MTS is disabled for sub-block-based prediction, such as affine mode or ATMVP mode.

Example 3. In one example, enabling/disabling NSST or MTS may be signaled in a group of CUs/CTU/CTB/slice header/picture header.

Example 4. In one example, transform matrix information may be inherited from a neighboring block of the current block.

(a) In one example, a neighboring block may be defined to be an adjacent spatial neighboring block, a non-adjacent neighboring block, or a temporal neighboring block.

(b) In one example, transform matrix information may include the primary transform is non-DCT-II transform flag (e.g., AMT CU flag) and/or primary matrix index.

(c) In one example, transform matrix information may include a secondary transform matrix index.

(d) In one example, transform matrix information may be stored along with the motion information. In one example, for each picture to be referenced by succeeding pictures, transform matrix information need to be stored.

(e) In one example, furthermore, pruning between merge/AMVP candidates may further depend on whether the associated transform matrix information is identical. If transform matrix information of two candidates is different, such two candidates may be both added to the final candidate list.

(f) In one example, only N merge/AMVP candidates inherit transform matrix information from neighboring blocks, while other merge/AMVP candidates use default transforms, wherein N is a positive integer.

(g) In one example, even a block is coded with skip mode, the transform information may also be required to be inherited from a neighbor where the motion information is inherited from.

(h) In one example, such a method may be applied to the merge mode and/or the AMVP mode, and/or sub-block-based coding modes.

(i) Alternatively, the transform matrix information of a neighboring block can be used as a prediction for the transform matrix information of the current block.

Example 5. In one example, default transforms may be assigned to certain modes/certain types of AMVP/merge/affine motion candidates or certain number of non-zero coefficients within a CU/PU/TU.

(a) For combined-bi merge candidates, default transforms may be used without being signaled.

(b) For zero merge candidates, default transforms may be used without being signaled.

(c) For merge candidates which involves motion information from temporal blocks (e.g., TMVP, ATMVP, STMVP), default transforms may be used without being signaled.

(d) For sub-block merge candidates (e.g., ATMVP, STMVP, planar motion mode), default transforms may be used without being signaled.

(e) When a block is coded with all zero coefficients (i.e., number of non-zero coefficients is equal to 0), a default transform index is assigned for the block.

(f) Alternatively, when a block is coded with all zero coefficients (i.e., number of non-zero coefficients is equal to 0) and the block is coded with AMVP mode, a default transform index is assigned for the block.

(g) For sub-block-based prediction, such as affine mode or ATMVP mode, default transforms may be used without being signaled.

Example 6. In one example, instead of counting how many non-zero coefficients within a block, the position of the last non-zero coefficient (for example, in the forward scanning order) is checked to determine whether the AMT CU flag is skipped or not. Denote the position by a coordinate (LastX, LastY) relative to the top-left position of a block. The coordinate of the top-left position is defined as (0, 0).

(a) When LastX<=Th0 and LastY<=Th1, the AMT CU flag is not signaled.

(b) When LastX<=Th0 or LastY<=Th1, the AMT CU flag is not signaled.

(c) Variables Th0, and/or Th1 may be pre-defined or signaled in SPS, PPS, slice header, picture header, groups of CUs, CTU, CTB, etc.

(d) Variables Th0, and/or Th1 may further depend on the block shape or size.

(e) Th0 and Th1 may depend on the quantization parameter (QP)

(f) Th0 and Th1 may depend on the coding mode (g) Th0=Th1

(h) Th0=Th1 if W=H; TH0>Th1 if W>H, TH<TH1 if W<H, where W and H are the width and height of the current block, respectively.

(i) Th0 and Th1 are both set to 1 or 0.

(j) Similarly, the above methods may be also applied to the NSST index signaling, that is, for some cases, the NSST index signaling is skipped.

Example 7. In one example, the signaling of transform matrix information (e.g., AMT CU flags and/or AMT index) may be modified by:

(a) One flag to indicate whether the transform index is inherited from a neighboring block where the motion information is inherited from is firstly signaled. If not inherited, the AMT CU flags and/or AMT index may be further signaled.

(b) The AMT CU flag may be firstly signaled for the merge mode. If the CU flag is set to 0, default transforms are utilized. Otherwise (if the CU flag is equal to 1), the AMT index may be inherited.

Example 8. In one example, transform information may depend on the motion vectors, and/or on the motion vector differences, and/or picture-order-count (POC) distances of reference pictures and current picture.

(a) In one example, transform information may depend on abs(MVx)+abs(MVy), or (MVx)*(MVx)+(MVy)*(MVy).

(b) In one example, transform information may depend on abs(MVDx)+abs(MVDy), or (MVDx)*(MVDx)+(MVDy)*(MVDy).

The examples described above may be incorporated in the context of the methods described below, e.g., methods 2500, 2600, 2700, 2800 and 2900, which may be implemented at a video decoder.

Figure 25:
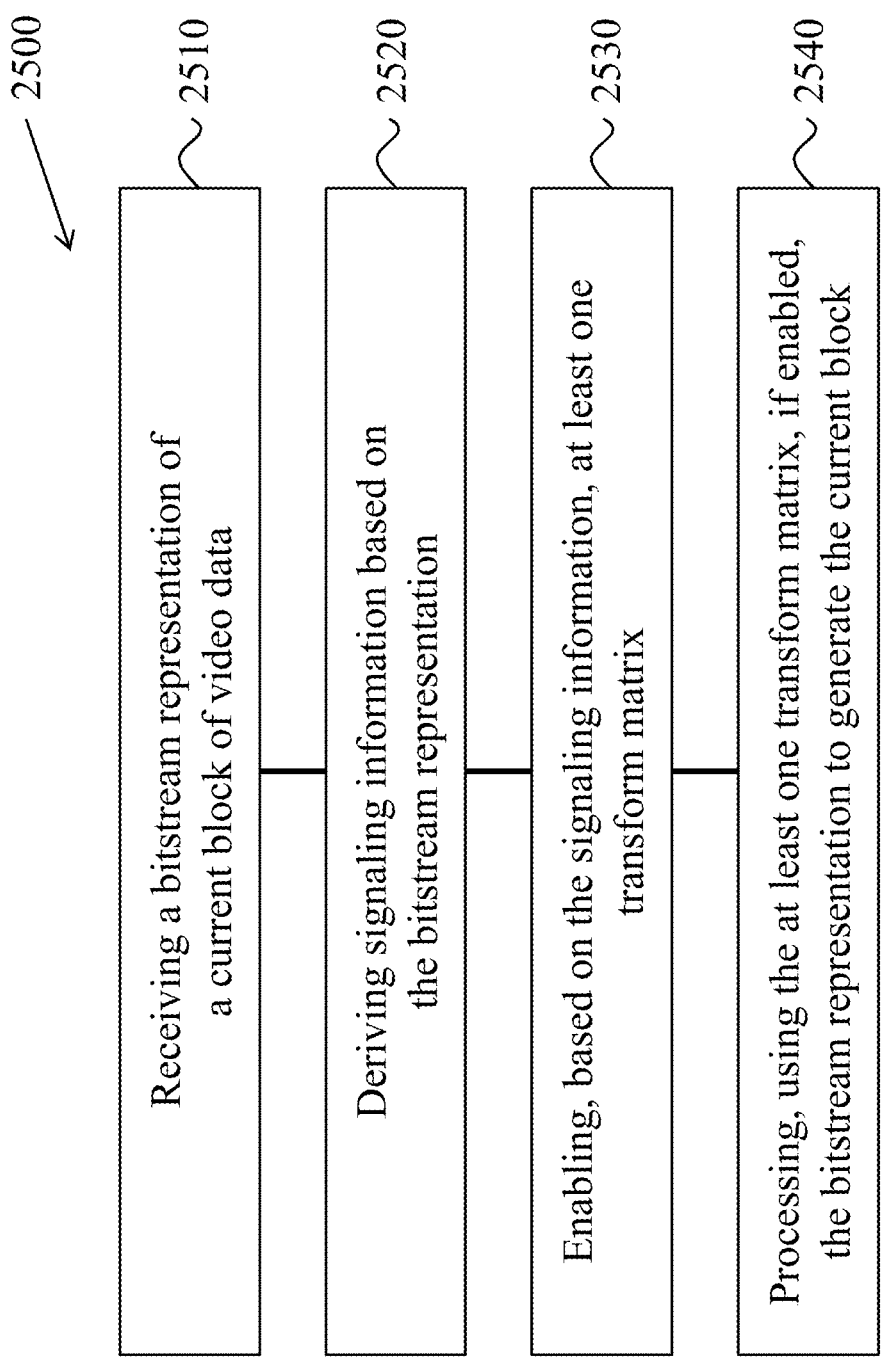
FIG. 25 shows a flowchart of an example method for video coding in accordance with the presently disclosed technology.

FIG. 25 shows a flowchart of an exemplary method for video coding. The method 2500 includes, at step 2510, receiving a bitstream representation of a current block of video data.

The method 2500 includes, at step 2520, deriving signaling information based on the bitstream representation.

The method 2500 includes, at step 2530, enabling, based on the signaling information, at least one transform matrix. In some embodiments, enabling the at least one transform matrix is based on a flag indicating a coded mode of the current block. In other embodiments, enabling the at least one transform matrix is based on the current block being intra-coded. In yet other embodiments, enabling the at least one transform matrix is based on the current block being inter-coded. In yet other embodiments, enabling the at least one transform matrix is based on the current block being an advanced motion vector prediction (AMVP)-coded block.

The method 2500 includes, at step 2540, processing, using the at least one transform matrix, if enabled, the bitstream representation to generate the current block.

In some embodiments, generating the current block comprises decompressing, or generating an uncompressed version of, the current block. In other embodiments, generating the current block comprises reconstructing the block.

In some embodiments, enabling the at least one transform matrix is based on a flag indicating a coded mode of the current block.

In some embodiments, enabling the at least one transform matrix is based on the current block being intra-coded.

In some embodiments, enabling the at least one transform matrix is based on the current block being inter-coded.

In some embodiments, enabling the at least one transform matrix is based on the current block being an advanced motion vector prediction (AMVP)-coded block.

Figure 26:
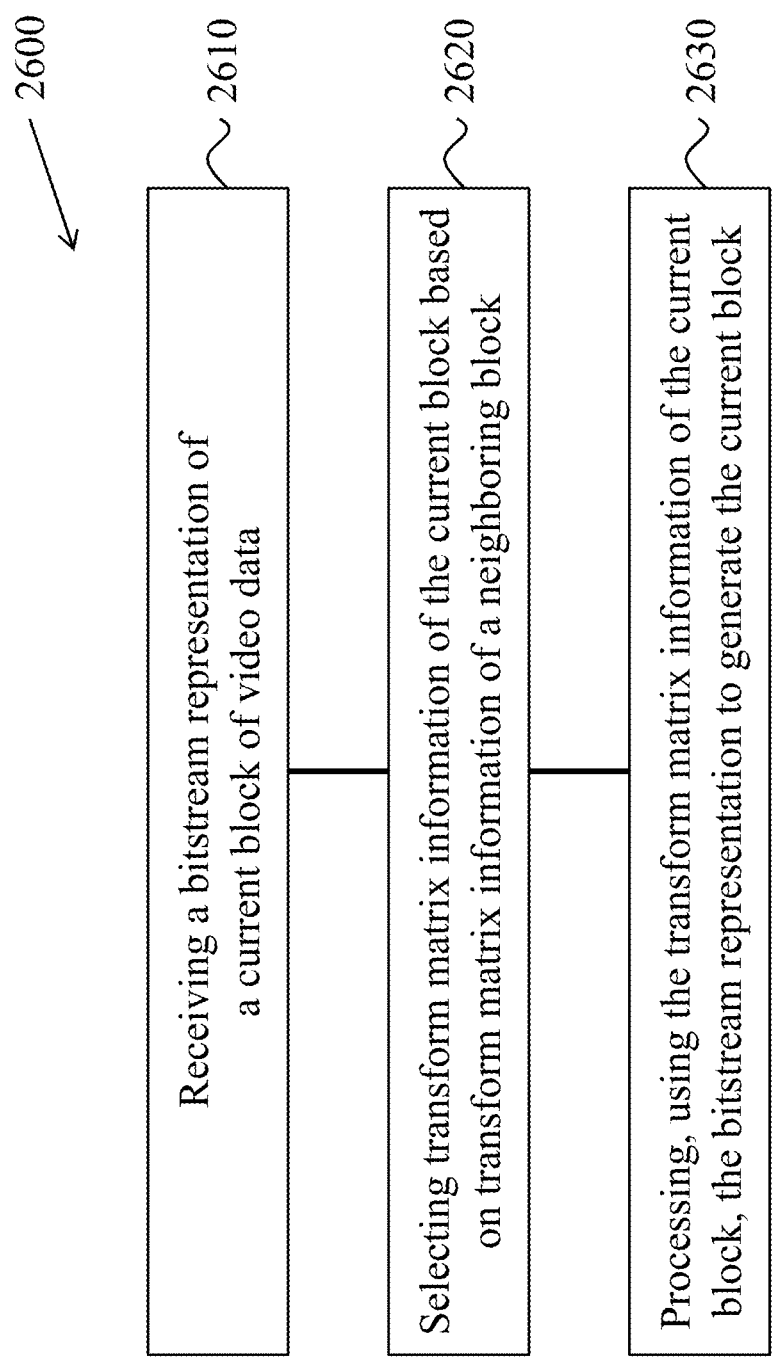
FIG. 26 shows a flowchart of another example method for video coding in accordance with the presently disclosed technology.

FIG. 26 shows a flowchart of another exemplary method for video coding. This example includes some features and/or steps that are similar to those shown in FIG. 25, and described above. At least some of these features and/or components may not be separately described in this section. The method 2600 includes, at step 2610, receiving a bitstream representation of a current block of video data.

The method 2600 includes, at step 2620, selecting transform matrix information of the current block based on transform matrix information of a neighboring block. In some embodiments, the neighboring block is an adjacent spatial neighboring block, a non-adjacent neighboring block or a temporal neighboring block.

The method 2600 includes, at step 2630, processing, using the transform matrix information of the current block, the bitstream representation to generate the current block.

In some embodiments, the transform matrix information includes a non-discrete Cosine transform (DCT)-II flag or a primary matrix index. In other embodiments, the transform matrix information includes a secondary transform matrix index.

In some embodiments, the transform matrix information of the neighboring block may be used as a predictor for the transform matrix information of the current block.

In some embodiments, pruning two merge candidates in a merge candidate list may be based on the transform matrix information of the two merge candidates.

Figure 27:
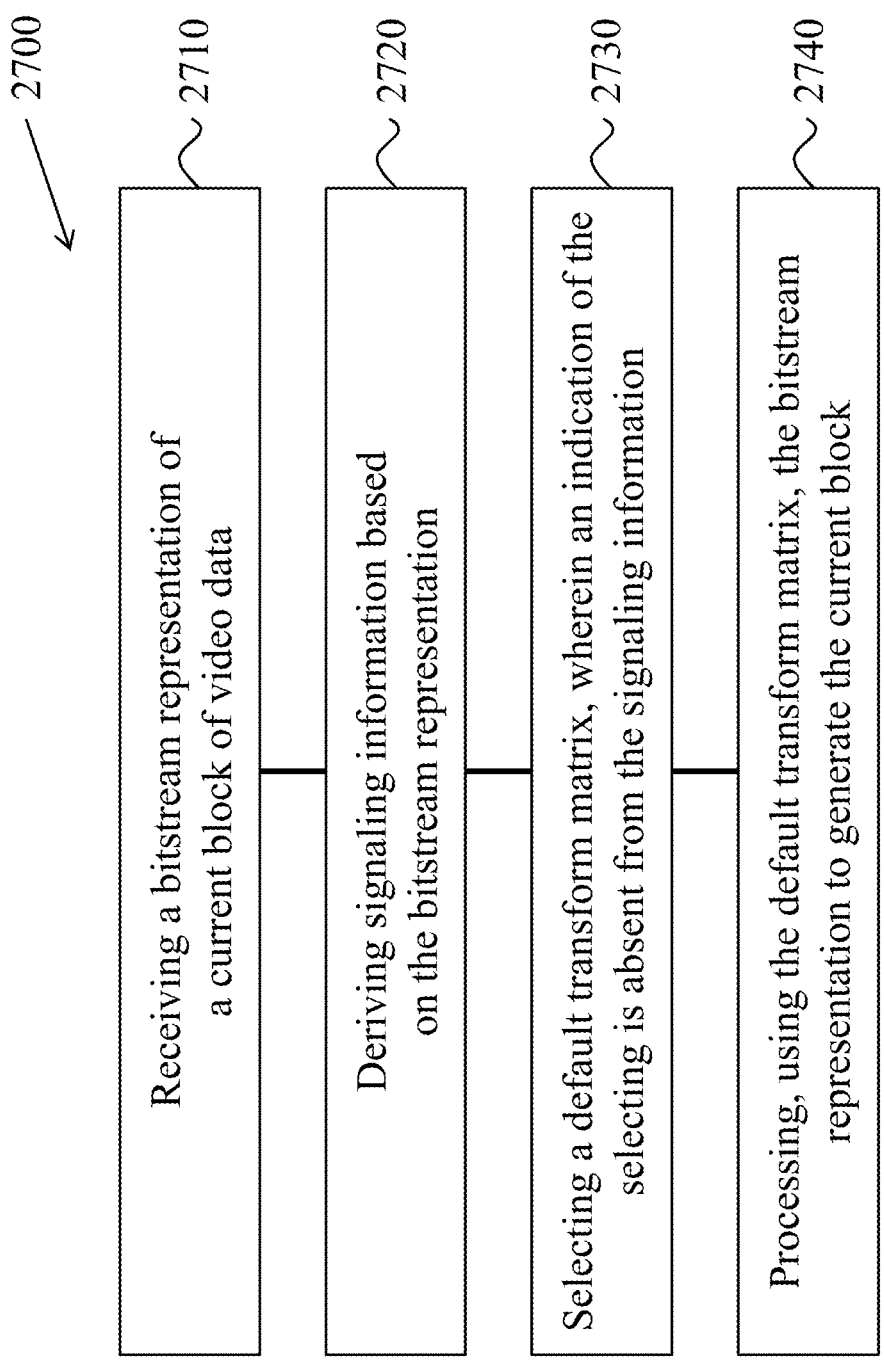
FIG. 27 shows a flowchart of yet another example method for video coding in accordance with the presently disclosed technology.

FIG. 27 shows a flowchart of yet another exemplary method for video coding. This example includes some features and/or steps that are similar to those shown in FIGS. 25 and 26, and described above. At least some of these features and/or components may not be separately described in this section. The method 2700 includes, at step 2710, receiving a bitstream representation of a current block of video data. In some embodiments, the current block is coded with all zero coefficients.

The method 2700 includes, at step 2720, deriving signaling information based on the bitstream representation.

The method 2700 includes, at step 2730, selecting a default transform matrix, wherein an indication of the selecting is absent from the signaling information.

The method 2700 includes, at step 2740, processing, using the default transform matrix, the bitstream representation to generate the current block. In some embodiments, the processing is based on combined bi-merge candidates or zero candidates.

Figure 28:
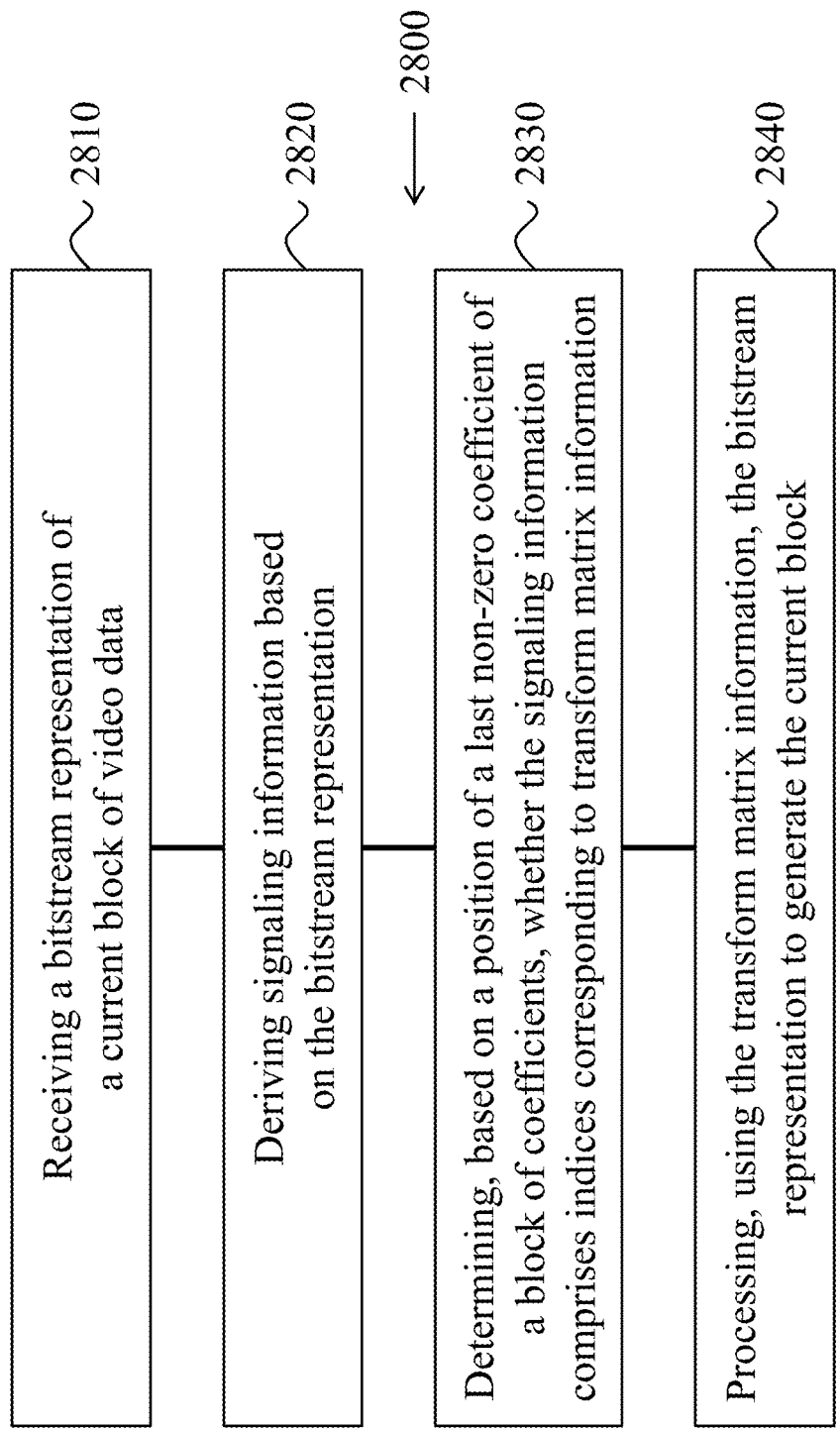
FIG. 28 shows a flowchart of yet another example method for video coding in accordance with the presently disclosed technology.

FIG. 28 shows a flowchart of yet another exemplary method for video coding. This example includes some features and/or steps that are similar to those shown in FIGS. 25-27, and described above. At least some of these features and/or components may not be separately described in this section. The method 2800 includes, at step 2810, receiving a bitstream representation of a current block of video data.

The method 2800 includes, at step 2820, deriving signaling information based on the bitstream representation.

The method 2800 includes, at step 2830, determining, based on a position of a last non-zero coefficient of a block of coefficients, whether the signaling information comprises indices corresponding to transform matrix information, wherein the block of coefficients is associated with the current block.

In some embodiments, the position of the last non-zero coefficient in the block of coefficients is $(X_{last}, Y_{last})$, where $X_{last} \leq \tau_1$ (a first threshold) and $Y_{last} \leq \tau_2$ (a second threshold), and where the signaling information does not comprise the indices. In an example, the first threshold or the second threshold is signaled in a Sequence Parameter Set (SPS), Picture Parameter Set (PPS), slice header, picture header, coding tree unit (CTU), coding unit (CU), or coding tree block (CTB). In another example, the first threshold or the second threshold is based on dimensions of the current block. In yet another example, the first threshold or the second threshold is based on a coding mode of the current block. In yet another example, the first threshold or the second threshold is based on a quantization parameter (QP).

The method 2800 includes, at step 2840, processing, using the transform matrix information, the bitstream representation to generate the current block. In some embodiments, the processing uses default transform matrices when the signaling information does not comprise the indices.

Figure 29:
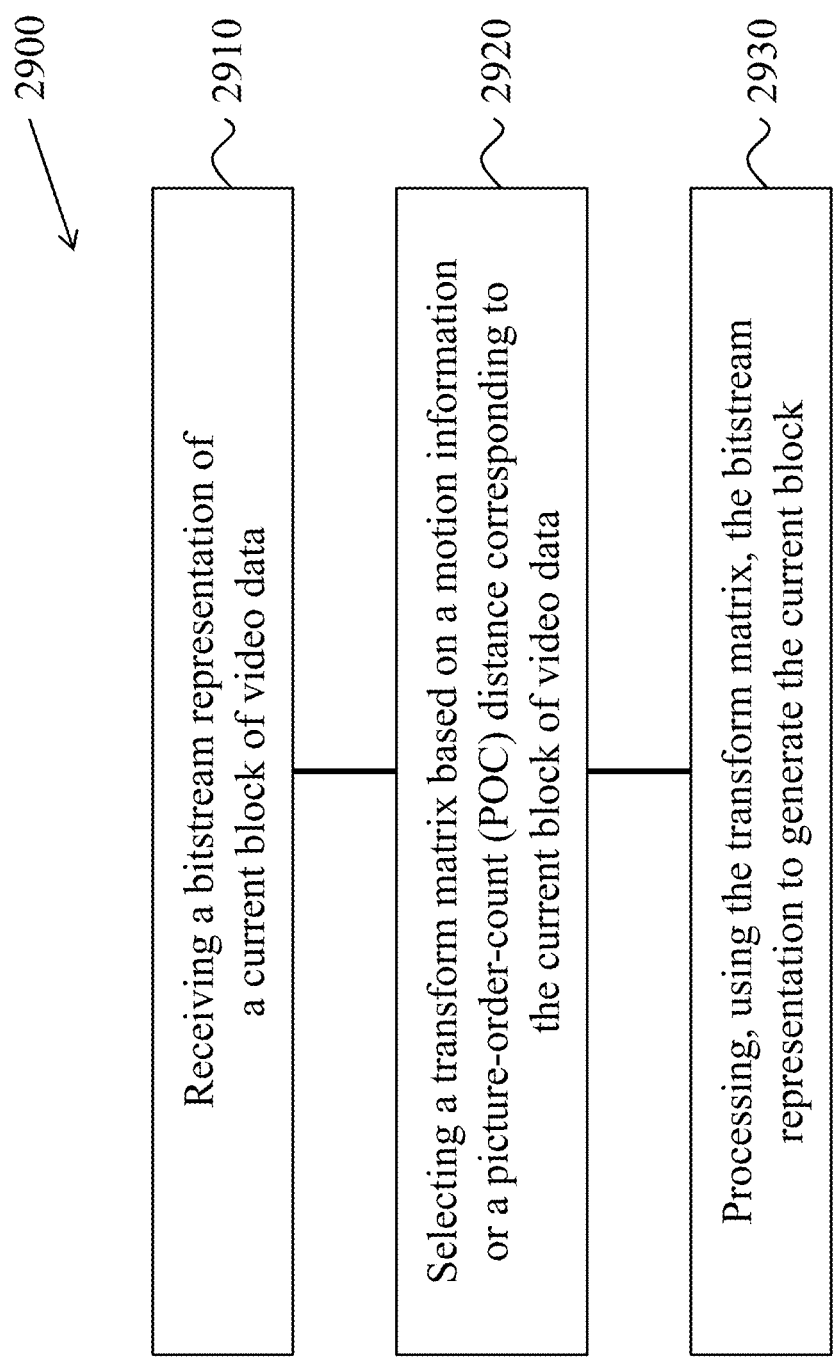
FIG. 29 shows a flowchart of yet another example method for video coding in accordance with the presently disclosed technology.

FIG. 29 shows a flowchart of yet another exemplary method for video coding. This example includes some features and/or steps that are similar to those shown in FIGS. 25-28, and described above. At least some of these features and/or components may not be separately described in this section. The method 2900 includes, at step 2910, receiving a bitstream representation of a current block of video data.

The method 2900 includes, at step 2920, selecting a transform matrix based on a motion information or a picture-order-count (POC) distance corresponding to the current block of video data.

The method 2900 includes, at step 2930, processing, using the transform matrix, the bitstream representation to generate the current block.

In some embodiments, the POC distance corresponds to a reference picture associated with the current block. In other embodiments, the motion information comprises motion vectors or motion vector differences.

The following listing of technical solutions may be preferred implementations in some embodiments.

Figures 12A, 12B:
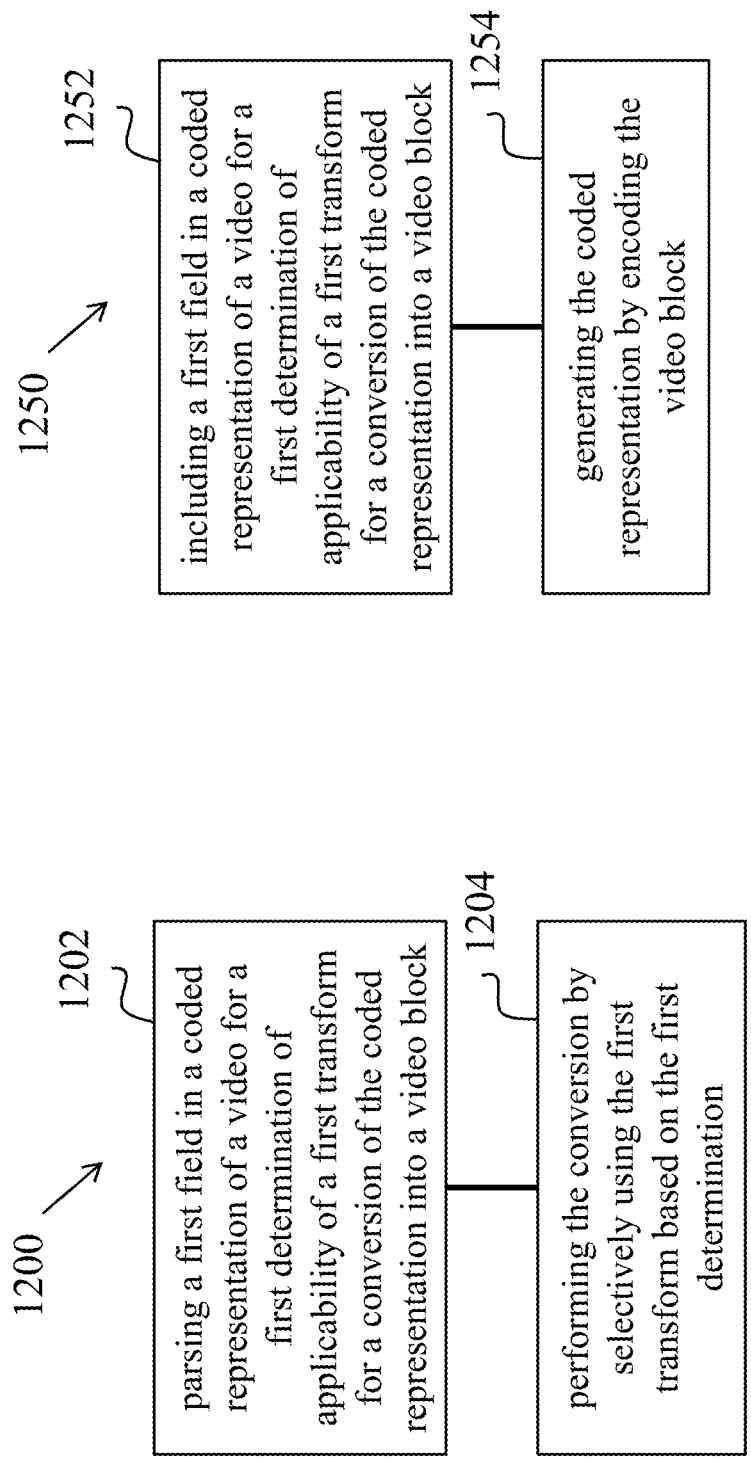
FIGS. 12A and 12B show flowcharts for examples of video processing methods.

1. A method of video processing (e.g., method 1200 shown in FIG. 12A), comprising: parsing (1202) a first field in a coded representation of a video for a first determination of applicability of a first transform for a conversion of the coded representation into a video block. During the conversion, the first transform is applied to a result of dequantized residual coefficient values of the video block. The method 1200 further includes performing (1204) the conversion by selectively using the first transform based on the first determination.

2. The method of solution 1, further including: parsing a second field in the coded representation of the video for a second determination of applicability of a second transform for the conversion, wherein the second transform is applied in cascade with the first transform during the conversion, and wherein the performing the conversion further includes selectively using the second transform based on the second determination.

3. The method of solution 2, wherein the first transform is used to transform the dequantized residual coefficient values into a first transformed representation and the second transform is used to transform at least a portion of the first transformed representation to a second transformed representation.

4. The method of solution 3, wherein the first transform is an adaptive multi-core transform (AMT).

5. The method of any of solutions 3-4, wherein the second transform is a non-separable secondary transform (NSST).

6. The method of any of solutions 1-3, wherein the first field corresponds to a flag at a picture parameter set level in the coded representation.

7. The method of any of solutions 1-3, wherein the first field corresponds to a flag at a slice header level in the coded representation.

8. The method of any of solutions 1-3, wherein the first field corresponds to a flag at a picture level in the coded representation.

9. The method of any of solutions 1-3 and 6-8, wherein the first determination or the second determination further is based on a coding mode used for representing the video block in the coded representation.

10. The method of any of solutions 1-3, wherein the first field is included in the coded representation at a video region level, wherein the video region includes at least the video block and wherein the first field indicates that the first transform is to be applied during the conversion upon successfully determining that a coding mode of the video block is a specific coding mode.

11. The method of solution 10, wherein the specific coding mode is an intra-coding mode.

12. The method of solution 10, wherein the specific coding mode is an inter coding mode.

13. The method of solution 10, wherein the specific coding mode is an advanced motion vector prediction coding mode.

14. The method of solution 10, wherein the specific coding mode is a merge coding mode that includes affine coding.

15. The method of solution 10, wherein the specific coding mode is a merge coding mode that excludes affine coding.

16. The method of solution 10, wherein the specific coding mode is a sub-block based coding mode.

17. The method of any of solution 1-16, wherein the field is at a coding unit group level or a coding tree unit level or a coding tree block level or a slice header level or a picture header level.

18. The method of any of solutions 6 to 17, wherein the first transform is an adaptive multi-core transform (AMT).

19. The method of any of solutions 6 to 17, wherein the second transform is a non-separable secondary transform (NSST).

20. A method of video processing (e.g., method 1300 shown in FIG. 13A), comprising: performing (1302) a determination, for a conversion between a current video block of a video and a coded representation of the video, that a coding mode used for the current video block is of a certain type; performing (1304) a determination, as a result of the coding mode being of the certain type, that a field indicating applicability of a first transform or a second transform for processing the current video block is absent in the coded representation; parsing (1306) the coded representation in absence of the field; and generating (1308) the current video block by disabling used of the first transform or the second transform for transforming dequantized residual coefficients of the current video block due to the determination.

21. The method of solution 20, wherein the certain type includes an advanced motion vector prediction coding mode.

22. The method of solution 20, wherein the certain type includes a sub-block based prediction mode.

23. The method of solution 22, wherein the sub-block based prediction mode comprises an alternate temporal motion vector prediction mode.

24. The method of any of solutions 20-23, wherein the first transform includes an adaptive multi-core transform (AMT).

25. The method of any of solutions 20-23, wherein the first transform includes a non-separable secondary transform.

The previous section provides additional features of the above solutions (e.g., items 1 and 3).

26. A method of video processing (e.g., method 1400 shown in FIG. 14A) comprising: inheriting (1402) transform information about a first transform for a conversion between a coded representation of a video block and the video block from a neighboring video block, wherein, during the conversion, the first transform is applied to a result of dequantized residual coefficient values of the video block; and performing (1404) the conversion by selectively using the first transform based on the first inheriting.

27. The method of solution 26, wherein the neighboring block is a spatially adjacent block.

28. The method of solution 26, wherein the neighboring block is a spatially non-adjacent block in a video picture comprising the video block.

29. The method of solution 26, wherein the neighboring block is a temporally neighboring block.

30. The method of any of solutions 26-29, wherein the transform information about the first transform includes a first indication of whether or not the first transform is a discrete cosine transform or a second indication of a primary matrix index of the first transform.

31. The method of any of solutions 26-30, wherein the result of dequantized residual coefficient values is computed by applying another transform to the dequantized residual coefficient values.

32. The method of solution 31, wherein the transform information about the first transform further includes an index identifying the another transform.

33. The method of any of solutions 26-30, wherein the first transform is used to transform at least a portion of a transformed representation of the dequantized residual coefficient values.

34. The method of any of solutions 26-33, wherein the inheriting includes inheriting the transform information stored with motion information for the neighboring video block.

35. The method of solution 34, wherein the transform information about the first transform is stored at a video picture level.

36. The method of solution 15, wherein the transform information about the first transform is stored at the picture level due to a picture being a reference picture.

37. The method of any of solutions 26 to 36, wherein the conversion includes generating a candidate list using a pruning operation that is dependent on the transform information about the first transform associated with candidates being pruned.

38. The method of solution any of solutions 26-37, wherein the inheriting is performed due to the video block inheriting one of first N candidates from the neighboring video block.

39. The method of solution 38, wherein the one of the first N candidates comprises a merge candidate.

40. The method of solution 39, wherein the one of the first N candidates comprises an advanced motion vector prediction candidate.

41. The method of any of solutions 26-37, further including: determining that the first video block is coded as a skipped block and wherein the inheriting the transform information about the first transform includes inheriting the transform information about the first transform from the neighboring video block from whom motion information is inherited.

42. The method of any of solutions 26 to 41, wherein the first video block is decoded using a merge mode.

43. The method of any of solutions 26 to 33, wherein the first video block is decoded using an advanced motion vector prediction mode.

44. The method of any of solutions 26 to 43, wherein the inheriting includes predictively determining the transform information about the first transform for the current video block based on transformation information about the neighboring video block.

The previous section provides additional features of the above solutions (e.g., item 4).

45. A method of video processing (e.g., method 1500 depicted in FIG. 15A), comprising: determining (1502), based on a coding condition of a current video block, that a first transform used for a conversion of the coded representation into the current video block is a default transform, wherein, during the conversion, the first transform is applied to a result of dequantized residual coefficient values of the current video block; and performing (1504) the conversion by selectively using the first transform based on the first determination.

46. The method of solution 45, wherein the coding condition of the current video block includes a coding mode of the first video block.

47. The method of solution 45, wherein the coding condition includes a count of non-zero coefficients coded in a coding unit or a prediction unit or a transform unit associated with the current video block.

48. The method of any of solutions 45-46, wherein the coding condition comprises use of a combined merge candidate for the current video block, and wherein the default transform is used without any signaling in the coded representation.

49. The method of any of solutions 45-46, wherein the coding condition comprises use of a zero merge candidate for the current video block, and wherein the default transform is used without any signaling in the coded representation.

50. The method of any of solutions 45-46, wherein the coding condition comprises using motion information of a temporally neighboring block of the current video block, and wherein the default transform is used without any signaling in the coded representation.

51. The method of solution 50, wherein the temporally neighboring block is used for temporal motion vector prediction.

52. The method of solution 50, wherein the temporally neighboring block is used for an alternate temporal motion vector prediction.

53. The method of solution 50, wherein the temporally neighboring block is used for a spatial-temporal motion vector prediction.

54. The method of any of solutions 45-46, wherein the coding condition includes using a sub-block merge candidate for the conversion of the current video block.

55. The method of solution 54, wherein the sub-block merge candidate includes an advanced temporal motion vector predictor.

56. The method of solution 54, wherein the sub-block merge candidate includes a spatial-temporal motion vector predictor.

57. The method of solution 54, wherein the sub-block merge candidate includes planar motion mode predictor.

58. The method of solution 45, wherein the coding condition corresponds to the current video block having coded with all zero coefficients, and determining includes determining that a default transform index is used for the conversion.

59. The method of any of solutions 45-46, wherein the coding condition comprises using sub-block based prediction for the current video block and wherein the transform information is determined without being signaled in the coded representation.

60. The method of solution 59, wherein the sub-block based prediction includes affine prediction, and wherein the transform information is determined without signaling in the coded representation.

61. The method of solution 59, wherein the sub-block based prediction includes advanced temporal motion vector prediction, and wherein the transform information is determined without signaling in the coded representation.

62. The method of solution 45, wherein the coding condition includes a function of motion vector values for the current video block.

63. The method of solution 63, wherein the function of motion vector values includes abs(MVx)+abs(MVy), or (MVx)*(MVx)+(MVy)*(MVy), where MVx and MVy are motion vector values and abs( ) represents absolute value function.

64. The method of solution 45, wherein the coding condition includes a function of motion vector difference values for the current video block.

65. The method of solution 64, wherein function of motion vector difference values includes abs(MVDx)+abs(MVDy), or (MVDx)*(MVDx)+(MVDy)*(MVDy), where MVDx and MVDy are motion vector difference values and abs( ) represents absolute value function.

The previous section provides additional features of the above solutions (e.g., items 5 and 8).

66. A method of video processing (e.g., method 1600 depicted in FIG. 16A), comprising: parsing (1602) a bitstream comprising a coded representation of multiple video blocks of a video, wherein the bitstream includes, for a current video block, a first indicator about whether a transform information of a neighboring block is inherited as a transform information for a current video block and decoding (1604), based on the transform information obtained from the parsing the first indicator, the coded representation to generate the current video block, wherein, during the conversion, a transform identified by the transform information is applied to a result of dequantized residual coefficient values of the current video block.

67. The method of solution 66, comprising: due to the first indicator indicating that the transform information is not inherited from a neighboring block, parsing a second indicator identifying the transform information used during the conversion.

68. The method of solution 66, wherein the transform comprises an adaptive multi-core transform (AMT).

69. The method of any of solutions 66-67, wherein the second indicator comprises a flag at a coding unit level in the bitstream.

70. The method of any of solutions 66-67, wherein the second indicator comprises an index to the transform.

Figures 17A, 17B:
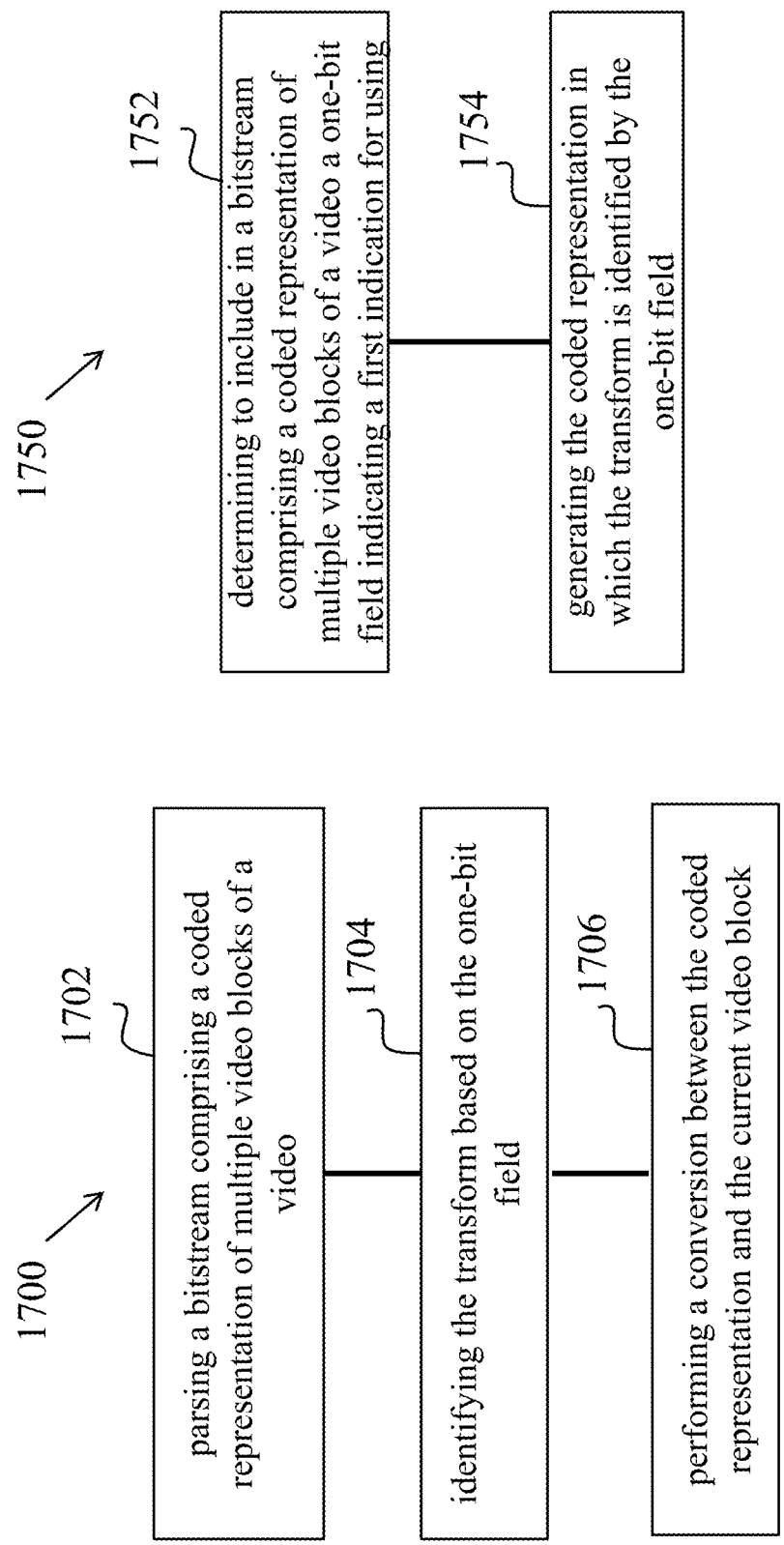
FIGS. 17A and 17B show flowcharts for examples of video processing methods.

71. A method of video processing (e.g., method 1700 depicted in FIG. 17A, comprising: parsing (1702) a bitstream comprising a coded representation of multiple video blocks of a video, wherein the bitstream includes, for a current video block that is coded using a merge mode, a one-bit field indicating a first indication for using, as a transform, a default transform, and a second indication for inheriting the transform information from a neighboring block is included in the coded representation; identifying (1704) the transform based on the one-bit field; and performing (1706) a conversion between the coded representation and the current video block; wherein, during the conversion, the transform is applied to a result of dequantized residual coefficient values of the current video block.

72. The method of solution 71, wherein the first indication comprises a "0" bit as the one-bit field and the second indication comprises a "1" bit as the one-bit field.

73. The method of solution 71, wherein the first indication comprises a "1" bit as the one-bit field and the second indication comprises a "0" bit as the one-bit field.

74. The method of any of solutions 71-73, wherein the transform comprises a adaptive multi-core transform (AMT).

75. The method of solution 66 to 74, comprising: the neighboring block is adjacent to the current video block.

76. The method of solution 66 to 74, comprising: the neighboring block is not adjacent to the current video block.

The previous section provides additional features of the above solutions (e.g., item 7).

77. A method of video processing (e.g., method 1250 depicted in FIG. 12B), comprising: including (1252) a first field in a coded representation of a video for a first determination of applicability of a first transform for a conversion of the coded representation into a video block, wherein, during the conversion, the first transform is to be applied to a result of dequantized residual coefficient values of the video block; and generating (1254) the coded representation by encoding the video block.

78. The method of solution 77, further including: including a second field in the coded representation of the video for a second determination of applicability of a second transform for the conversion, wherein the second transform is to be applied in cascade with the first transform during the conversion, and wherein the performing the conversion further includes selectively using the second transform based on the second determination.

79. The method of solution 78, wherein the first transform is used to transform the dequantized residual coefficient values into a first transformed representation and the second transform is used to transform at least a portion of the first transformed representation to a second transformed representation.

80. The method of solution 79, wherein the first transform is an adaptive multi-core transform (AMT).

81. The method of any of solutions 79-80, wherein the second transform is a non-separable secondary transform (NSST).

82. The method of any of solutions 77-79, wherein the first field corresponds to a flag at a picture parameter set level in the coded representation.

83. The method of any of solutions 77-79, wherein the first field corresponds to a flag at a slice header level in the coded representation.

84. The method of any of solutions 77-79, wherein the first field corresponds to a flag at a picture level in the coded representation.

85. The method of any of solutions 77-79 and 82-84, wherein the first determination or the second determination further is based on a coding mode used for representing the video block in the coded representation.

86. The method of any of solutions 77-79, wherein the first field is included in the coded representation at a video region level, wherein the video region includes at least the video block and wherein the first field indicates that the first transform is to be applied during the conversion upon successfully determining that a coding mode of the video block is a specific coding mode.

87. The method of solution 86, wherein the specific coding mode is an intra-coding mode.

88. The method of solution 86, wherein the specific coding mode is an inter coding mode.

89. The method of solution 86, wherein the specific coding mode is an advanced motion vector prediction coding mode.

90. The method of solution 86, wherein the specific coding mode is a merge coding mode that includes affine coding.

91. The method of solution 86, wherein the specific coding mode is a merge coding mode that excludes affine coding.

92. The method of solution 86, wherein the specific coding mode is a sub-block based coding mode.

93. The method of any of solution 77-92, wherein the field is at a coding unit group level or a coding tree unit level or a coding tree block level or a slice header level or a picture header level.

94. The method of any of solutions 82-93, wherein the first transform is an adaptive multi-core transform (AMT).

95. The method of any of solutions 82 to 93, wherein the second transform is a non-separable secondary transform (NSST).

The previous section provides additional features of the above solutions (e.g., items 1 and 3).

96. A method of video processing (e.g., method 1350 depicted in FIG. 13B), comprising: performing (1352) a determination, for a conversion between a current video block of a video and a coded representation of the video, that a coding mode used for the current video block is of a certain type; performing (1354) a determination, as a result of the coding mode being of the certain type, that a field indicating applicability of a first transform or a second transform for processing the current video block is not to be included the coded representation; and generating (1356) the coded representation without including the field; wherein the current video block is decodable by disabling used of the first transform and/or the second transform for transforming dequantized residual coefficients of the current video block due to the determination.

97. The method of solution 96, wherein the certain type includes an advanced motion vector prediction coding mode.

98. The method of solution 96, wherein the certain type includes a sub-block based prediction mode.

99. The method of solution 98, wherein the sub-block based prediction mode comprises an alternate temporal motion vector prediction mode.

100. The method of any of solutions 96-99, wherein the first transform includes an adaptive multi-core transform (AMT).

101. The method of any of solutions 96 to 99, wherein the first transform includes a non-separable secondary transform.

The previous section provides additional features of the above solutions (e.g., item 2).

102. A method of video processing (e.g., method 1450 depicted in FIG. 14B), comprising: determining (1452) that transform information about a first transform for a conversion between a coded representation of a video block and the video block is to be inherited from a neighboring video block, wherein, during the conversion, the first transform is applied to a result of dequantized residual coefficient values of the video block; and generating (1454) the coded representation based on the determining.

103. The method of solution 102, wherein the neighboring block is a spatially adjacent block.

104. The method of solution 102, wherein the neighboring block is a spatially non-adjacent block in a video picture comprising the video block.

105. The method of solution 102, wherein the neighboring block is a temporally neighboring block.

106. The method of any of solutions 102-105, wherein the transform information about the first transform includes a first indication of whether or not the first transform is a discrete cosine transform or a second indication of a primary matrix index of the first transform.

107. The method of any of solutions 102-106, wherein the result of dequantized residual coefficient values is computed by applying another transform to the dequantized residual coefficient values.

108. The method of solution 107, wherein the transform information about the first transform further includes an index identifying the another transform.

109. The method of any of solutions 102-106, wherein the first transform is used to transform at least a portion of a transformed representation of the dequantized residual coefficient values.

110. The method of any of solutions 102-109, wherein the inheriting includes inheriting the transform information stored with motion information for the neighboring video block.

111. The method of solution 110, wherein the transform information about the first transform is stored at a video picture level.

112. The method of solution 111, wherein the transform information about the first transform is stored at the picture level due to a picture being a reference picture.

113. The method of any of solutions 102 to 112, wherein the conversion includes generating a candidate list using a pruning operation that is dependent on the transform information about the first transform associated with candidates being pruned.

114. The method of solution any of solutions 102-113, wherein the inheriting is to be performed due to the video block inheriting one of first N candidates from the neighboring video block.

115. The method of solution 114, wherein the one of the first N candidates comprises a merge candidate.

116. The method of solution 114, wherein the one of the first N candidates comprises an advanced motion vector prediction candidate.

117. The method of any of solutions 102-113, further including: determining that the first video block is to be coded as a skipped block and wherein the inheriting the transform information about the first transform includes inheriting the transform information about the first transform from the neighboring video block from whom motion information is inherited.

118. The method of any of solutions 1 to 117, wherein the first video block is encoded using a merge mode.

119. The method of any of solutions 102 to 108 wherein the first video block is encoded using an advanced motion vector prediction mode.

120. The method of any of solutions 102 to 119, wherein the inheriting includes predictively determining the transform information about the first transform for the current video block based on transformation information about the neighboring video block.

The previous section provides additional features of the above solutions (e.g., item 4).

121. A method of video processing (e.g., method 1550 depicted in FIG. 15B), comprising: determining (1552), based on a coding condition of a current video block, that a first transform is to be used for a conversion of the coded representation into the current video block is a default transform, wherein, during the conversion, the first transform is applied to a result of dequantized residual coefficient values of the current video block; and generating (1554) the coded representation of the current video block based on the first determination.

122. The method of solution 121, wherein the coding condition of the current video block includes a coding mode of the first video block.

123. The method of solution 121, wherein the coding condition includes a count of non-zero coefficients coded in a coding unit or a prediction unit or a transform unit associated with the current video block.

124. The method of any of solutions 121-122, wherein the coding condition comprises use of a combined merge candidate for the current video block, and wherein the default transform is to be used without any signaling in the coded representation.

125. The method of any of solutions 121-122, wherein the coding condition comprises use of a zero merge candidate for the current video block, and wherein the default transform is implicitly signaled in the coded representation.

126. The method of any of solutions 121-122, wherein the coding condition comprises using motion information of a temporally neighboring block of the current video block, and wherein the default transform is implicitly signaled in the coded representation.

127. The method of solution 126, wherein the temporally neighboring block is used for temporal motion vector prediction.

128. The method of solution 126, wherein the temporally neighboring block is used for an alternate temporal motion vector prediction.

129. The method of solution 126, wherein the temporally neighboring block is used for a spatial-temporal motion vector prediction.

130. The method of any of solutions 121-122, wherein the coding condition includes using a sub-block merge candidate for the conversion of the current video block.

131. The method of solution 130, wherein the sub-block merge candidate includes an advanced temporal motion vector predictor.

132. The method of solution 130, wherein the sub-block merge candidate includes a spatial-temporal motion vector predictor.

133. The method of solution 130, wherein the sub-block merge candidate includes planar motion mode predictor.

134. The method of solution 121, wherein the coding condition corresponds to the current video block having coded with all zero coefficients, and determining includes determining that a default transform index is to be used for the conversion.

135. The method of any of solutions 121-122, wherein the coding condition comprises using sub-block based prediction for the current video block and wherein the transform information is implicitly signaled in the coded representation.

136. The method of solution 135, wherein the sub-block based prediction includes affine prediction, and wherein the transform information is implicitly signaled in the coded representation.

137. The method of solution 135, wherein the sub-block based prediction includes advanced temporal motion vector prediction, and wherein the transform information is implicitly signaled in the coded representation.

138. The method of solution 121, wherein the coding condition includes a function of motion vector values for the current video block.

139. The method of solution 138, wherein the function of motion vector values includes abs(MVx)+abs(MVy), or (MVx)*(MVx)+(MVy)*(MVy), where MVx and MVy are motion vector values and abs( ) represents absolute value function.

140. The method of solution 121, wherein the coding condition includes a function of motion vector difference values for the current video block.

141. The method of solution 140, wherein function of motion vector difference values includes abs(MVDx)+abs(MVDy), or (MVDx)*(MVDx)+(MVDy)*(MVDy), where MVDx and MVDy are motion vector difference values and abs( ) represents absolute value function.

The previous section provides additional features of the above solutions (e.g., items 5 and 8).

142. A method of video processing (e.g., method 1650 depicted in FIG. 16B), comprising: determining (1652) to include in a bitstream comprising a coded representation of multiple video blocks of a video, for a current video block, a first indicator about whether a transform information of a neighboring block is inherited as a transform information for a current video block; and generating (1654), based on the transform information, the coded representation of the current video block; wherein, during decoding, a transform identified by the transform information is to be applied to a result of dequantized residual coefficient values of the current video block.

143. The method of solution 142, further including, or, in absence of the first indicator, a second indicator identifying the transform information used during a conversion between the coded representation and the current video block 144. The method of solution 142, wherein the transform comprises an adaptive multi-core transform (AMT).

145. The method of any of solutions 142-143, wherein the second indicator comprises a flag at a coding unit level in the bitstream.

146. The method of any of solutions 142-143, wherein the second indicator comprises an index to the transform.

147. A method of video processing (e.g., method 1750 depicted in FIG. 17B), comprising: determining (1752) to include a bitstream comprising a coded representation of multiple video blocks of a video, for a current video block that is coded using a merge mode, a one-bit field indicating a first indication for using, as a transform, a default transform, and a second indication for using an index identifying the transform included in the coded representation; and generating (1754) the coded representation in which the transform is identified by the one-bit field.

148. The method of solution 147, wherein the first indication comprises a "0" bit as the one-bit field and the second indication comprises a "1" bit as the one-bit field.

149. The method of solution 147, wherein the first indication comprises a "1" bit as the one-bit field and the second indication comprises a "0" bit as the one-bit field.

150. The method of any of solutions 147-149, wherein the transform comprises a adaptive multi-core transform (AMT).

The previous section provides additional features of the above solutions (e.g., item 7).

151. A video encoder apparatus comprising a processor, configured to implement a method described in one or more of solutions 1 to 150.

152. A computer program product having code stored thereon, the code, upon execution, causing a processor to implement a method described in one or more of solutions 1 to 150.

153. A method, apparatus or system described in the present document.

The following clauses list additional examples of solutions that may be implemented on the decoding, encoding or transcoding side.

1. A method of video processing (e.g., method 1800 shown in FIG. 18A), comprising: checking (1802), during a conversion from a coded representation of a current video block to the current video block, a position of a last non-zero coefficient of the current video block, wherein the position is relative to a top-left position of the current video block; and performing (1804) a determination, based on the position, whether or not to parse a syntax element which signals a transform information in the coded representation.

2. The method of clause 1, further including: performing the conversion by parsing the coded representation according to the determination.

3. A method of video processing (e.g., method 1900 shown in FIG. 19A), comprising: checking (1902), during conversion from a coded representation of a current video block to the current video block, a position of a last non-zero coefficient of the current video block, wherein the position is relative to a top-left position of the current video block; determining (1904), due to the position and at least one other coding criterion satisfying a condition, that a syntax element signaling a transform information is present and included in the coded representation; and performing (1906) the conversion using the transform information identified by the syntax element in the coded representation.

4. A method of video processing (e.g., method 2000 shown in FIG. 20A), comprising: checking (2002), during a conversion from a coded representation of a current video block to the current video block, a position of a last non-zero coefficient of the current video block, wherein the position is relative to a top-left position of the current video block; determining (2004) due to the position and/or at least one other coding criterion failing to satisfy a condition, that a syntax element signaling a transform information is skipped from inclusion in the coded representation; and performing (2006) the conversion using a default transform that is not explicitly identified in the coded representation.

5. The method of any of clauses 2 to 4, wherein the conversion includes applying a transform according to the syntax element to a result of dequantized residual coefficient values of the current video block.

6. The method of clause 1, wherein the position is represented by coordinates (LastX, LastY), wherein the coded representation is without the syntax element signaling the transform information due to LastX<=Th0 and LastY<=Th1, where Th1 and Th2 are numbers.

7. The method of clause 1, wherein the coded representation is without the syntax element signaling the transform information due to LastX<=Th0 or LastY<=Th1, where Th1 and Th2 are numbers.

8. The method of any of clauses 6-7, wherein Th1 and Th2 are predefined and not signaled in the coded representation.

9. The method of any of clauses 6-7, wherein Th1 and Th2 are signaled in the coded representation.

10. The method of clause 6, wherein Th1 and Th2 are signaled at a sequence parameter set level or a picture parameter set level or a slice header level or a picture header level or a group of coding unit level or a coding tree unit level or a coding tree block level.

11. The method of any of clauses 6-7, wherein Th1 and Th2 depend on a shape or a size of the current video block.

12. The method of any of clauses 6-7, wherein Th1 and Th2 depend on a quantization parameter used for the current video block.

13. The method of any of clauses 6-7, wherein Th1 and Th2 depend on a coding mode used for the current video block.

14. The method of any of clauses 6-13, wherein Th1 and Th2 are equal.

15. The method of clause 13, wherein Th1=Th2=1.

16. The method of clause 13, wherein Th1=Th2=0.

17. The method of any of clauses 6-7, wherein Th1 and Th2 are determined to be equal if the current video block is a square shaped block, determined to have Th0>Th1 if a width of the current video block is greater than a height of the current video block and Th1 is less than Th2 otherwise.

18. The method of any of clauses 1 to 16, wherein the transform information indicates a secondary transform.

19. The method of any of clauses 1 to 16, wherein the transform information indicates a non-separable secondary transform.

20. The method of any of clauses 1 to 19, wherein when the transform information is not signaled in the coded representation, and the conversion comprises performing the conversion without using a secondary transform.

21. The method of any of clauses 1 to 17, wherein the transform information indicates a primary transform information.

22. The method of any of clauses 6 to 19, wherein due to LastX<=Th0 and LastY<=Th1, wherein the coded representation is without the syntax element signaling application of a Discrete Cosine Transform (DCT-II) during the conversion.

23. The method of any of clauses 6 to 19, wherein due to LastX<=Th0 or LastY<=Th1, wherein the coded representation is without the syntax element signaling application of a Discrete Cosine Transform (DCT-II) during the conversion.

24. The method of any of clauses 18-20, wherein the conversion includes, in case that a primary transform information is not signaled, applying a Discrete Cosine Transform (DCT-II) to dequantized coefficients of the current video block.

25. A method of video processing (e.g., method 1850 shown in FIG. 18B), comprising: checking (1852), during a conversion of a current video block to a coded representation of the current video block, a position of a last non-zero coefficient of the current video block, wherein the position is relative to a top-left position of the current video block; and determining (1854), based on the position, whether or not to code a syntax element which signals a transform information in the coded representation.

26. A method of video processing (e.g., method 1950 shown in FIG. 19B), comprising: checking (1952), during conversion from a coded representation of a current video block to the current video block, a position of a last non-zero coefficient of the current video block, wherein the position is relative to a top-left position of the current video block; determining (1954), due to the position and at least one other coding criterion satisfying a condition, that a syntax element signaling a transform information is to be included in the coded representation; and performing (1956) the conversion by including the syntax element identifying the transform information in the coded representation.

27. A method of video processing (e.g., method 2050 shown in FIG. 20B), comprising: checking (2052), during a conversion from a coded representation of a current video block to the current video block, a position of a last non-zero coefficient of the current video block, wherein the position is relative to a top-left position of the current video block; determining (2054) due to the position and/or at least one other coding criterion failing to satisfy a condition, that a syntax element signaling a transform information is skipped from inclusion in the coded representation; and generating (2056) the coded representation by skipping the syntax element, thereby implicitly signaling use of a default transform.

28. The method of any of clauses 25 to 27, wherein a transform indicated by the transform information is applied to residual coefficient values prior to quantizing resulting transformed residual coefficient values during the conversion.

29. The method of clause 25, wherein the position is represented by coordinates (LastX, LastY), wherein the coded representation is without the syntax element signaling the transform information due to LastX<=Th0 and LastY<=Th1, where Th1 and Th2 are numbers.

30. The method of clause 25, wherein the coded representation is without the syntax element signaling the transform information due to LastX<=Th0 or LastY<=Th1, where Th1 and Th2 are numbers.

31. The method of any of clauses 29-30, wherein Th1 and Th2 are predefined and not signaled in the coded representation.

32. The method of any of clauses 29-30, wherein Th1 and Th2 are signaled in the coded representation.

33. The method of clause 32, wherein Th1 and Th2 are signaled at a sequence parameter set level or a picture parameter set level or a slice header level or a picture header level or a group of coding unit level or a coding tree unit level or a coding tree block level.

34. The method of any of clauses 29-30, wherein Th1 and Th2 depend on a shape or a size of the current video block.

35. The method of any of clauses 29-30, wherein Th1 and Th2 depend on a quantization parameter used for the current video block.

36. The method of any of clauses 29-30, wherein Th1 and Th2 depend on a coding mode used for the current video block.

37. The method of any of clauses 29-36, wherein Th1 and Th2 are equal.

38. The method of clause 37, wherein Th1=Th2=1.

39. The method of clause 37, wherein Th1=Th2=0.

40. The method of any of clauses 29-30, wherein Th1 and Th2 are determined to be equal if the current video block is a square shaped block, determined to have Th0>Th1 if a width of the current video block is greater than a height of the current video block and Th1 is less than Th2 otherwise.

41. The method of any of clauses 25 to 40, wherein the transform information a non-separable secondary transform.

42. The method of any of clauses 25 to 40, wherein the transform information a separable secondary transform.

43. The method of any of clauses 25 to 40, wherein the transform information indicates a non-separable secondary transform.

44. The method of any of clauses 25 to 43, wherein when the transform information is not signaled in the coded representation, and the conversion comprises performing the conversion without using a secondary transform.

45. The method of any of clauses 25 to 44, wherein the transform information indicates a primary transform information.

46. The method of any of clauses 1 to 45, wherein the position of the last non-zero coefficient of the current video block is in a forward scanning order of coefficients of the current video block. The forward scanning order may be, for example, as is defined in the VVC specification.

The previous section provides additional features of the above solutions (e.g., item 6).

47. A video encoder apparatus comprising a processor, configured to implement a method described in one or more of clauses 1 to 46.

48. A video decoder apparatus comprising a processor, configured to implement a method described in one or more of above clauses.

49. A computer program product having code stored thereon, the code, upon execution, causing a processor to implement a method described in one or more of clauses 1 to 46.

50. A method, apparatus or system described in the present document.

7. Example Implementations of the Disclosed Technology

Figure 30:
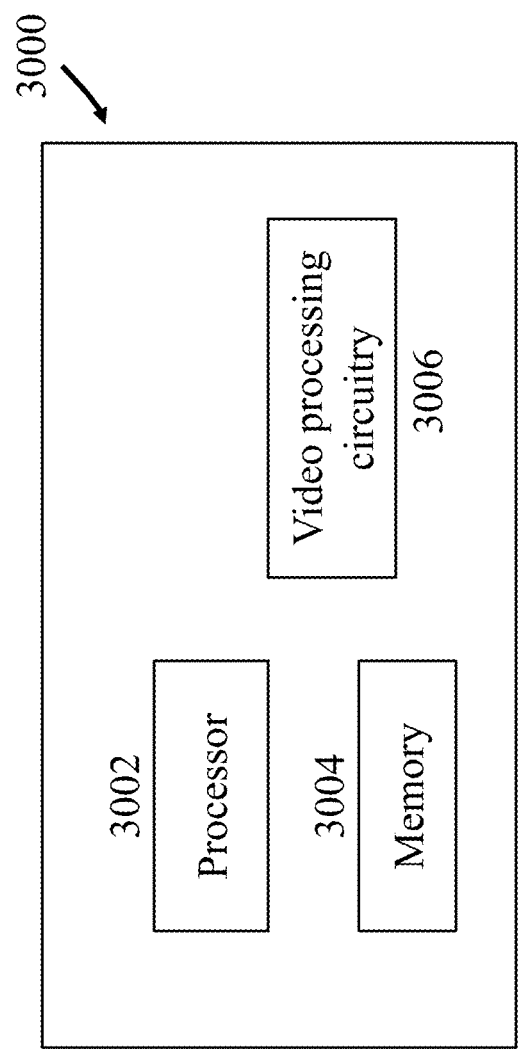
FIG. 30 is a block diagram of an example of a hardware platform for implementing a visual media decoding or a visual media encoding technique described in the present document.

FIG. 30 is a block diagram of a video processing apparatus 3000. The apparatus 3000 may be used to implement one or more of the methods described herein. The apparatus 3000 may be embodied in a smartphone, tablet, computer, Internet of Things (IoT) receiver, and so on. The apparatus 3000 may include one or more processors 3002, one or more memories 3004 and video processing hardware 3006. The processor(s) 3002 may be configured to implement one or more methods (including, but not limited to, various methods described herein) described in the present document. The memory (memories) 3004 may be used for storing data and code used for implementing the methods and techniques described herein. The video processing hardware 3006 may be used to implement, in hardware circuitry, some techniques described in the present document.

In some embodiments, the video coding methods may be implemented using an apparatus that is implemented on a hardware platform as described with respect to FIG. 30.

Figure 32:
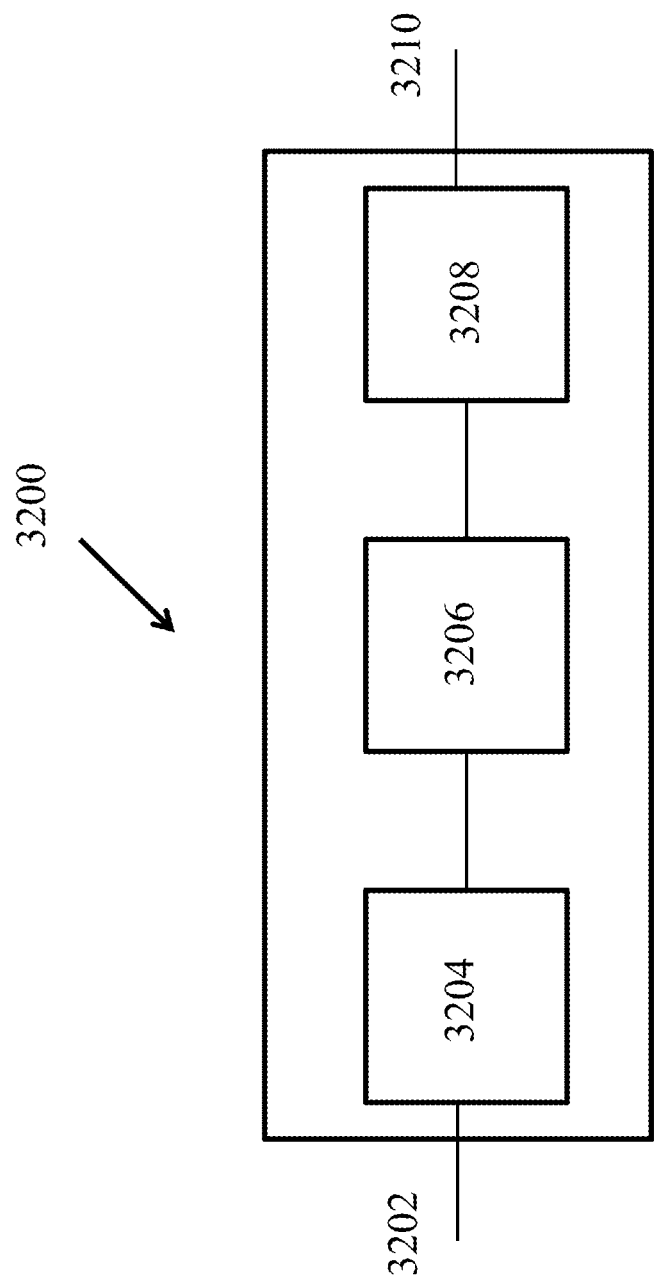
FIG. 32 is a block diagram of an example video processing system in which disclosed techniques may be implemented.

FIG. 32 is a block diagram showing an example video processing system 3200 in which various techniques disclosed herein may be implemented. Various implementations may include some or all of the components of the system 3200. The system 3200 may include input 3202 for receiving video content. The video content may be received in a raw or uncompressed format, e.g., 8 or 10 bit multi-component pixel values, or may be in a compressed or encoded format. The input 3202 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3200 may include a coding component 3204 that may implement the various coding or encoding methods described in the present document. The coding component 3204 may reduce the average bitrate of video from the input 3202 to the output of the coding component 3204 to produce a coded representation of the video. The coding techniques are therefore sometimes called video compression or video transcoding techniques. The output of the coding component 3204 may be either stored, or transmitted via a communication connected, as represented by the component 3206. The stored or communicated bitstream (or coded) representation of the video received at the input 3202 may be used by the component 3208 for generating pixel values or displayable video that is sent to a display interface 3210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    checking, during a conversion between a current video block of a video and a bitstream of the video, a position of a last non-zero coefficient of the current video block, wherein the position is relative to a top-left position of the current video block; and
    performing a determination, based on the position, whether a syntax element identifying a transform information for a multiple transform selection (MTS) transform is included in the bitstream or not,
    wherein the position is represented by coordinates (LastX, LastY), wherein the syntax element is skipped from inclusion in the bitstream due to LastX<=Th1 and LastY<=Th2, where Th1 and Th2 are numbers, and wherein Th1 and Th2 are predefined and not signaled in the bitstream, and Th1 and Th2 are equal.

2. The method of claim 1, performing the determination, comprising:
    determining due to the position failing to satisfy a first condition, that the syntax element is skipped from inclusion in the bitstream; and the method further comprising:
    performing the conversion without using the MTS transform.

3. The method of claim 2, further comprising:
    performing the conversion using a default transform that is not explicitly identified in the bitstream.

4. The method of claim 3, wherein the default transform is a discrete cosine transform II (DCT-II).

5. The method of claim 1, wherein Th1=Th2=0.

6. The method of claim 1, performing the determination, further comprising:
    determining due to a coding mode used for the current video block is a certain type, that the syntax element is skipped from inclusion in the bitstream; and the method further comprising:
    performing the conversion without using the MTS transform.

7. The method of claim 1, wherein the position of the last non-zero coefficient of the current video block is in a forward scanning order of coefficients of the current video block.

8. The method of claim 1, wherein the transform includes at least one of: a forward transform or an inverse transform.

9. The method of claim 1, performing the determination, comprising:
    determining, due to the position and at least one other coding criterion satisfying a second condition, that the syntax element is included in the bitstream; and the method further comprising:
    performing the conversion using the transform information identified by the syntax element in the bitstream.

10. The method of claim 9, wherein the conversion includes applying the MTS transform according to the syntax element to a result of dequantized residual coefficient values of the current video block.

11. The method of claim 9, wherein the transform information indicates a primary transform.

12. The method of claim 1, further comprising:
    performing the conversion by decoding the current video block from the bitstream according to the determination.

13. The method of claim 1, further comprising:
    performing the conversion by encoding the current video block into the bitstream according to the determination.

14. An apparatus for processing video data comprising a processor and a non-transitory memory with instructions thereon, wherein the instructions upon execution by the processor, cause the processor to:
    check, during a conversion between a current video block of a video and a bitstream of the video, a position of a last non-zero coefficient of the current video block, wherein the position is relative to a top-left position of the current video block; and perform a determination, based on the position, whether a syntax element identifying a transform information for a multiple transform selection (MTS) transform is included in the bitstream or not, wherein the position is represented by coordinates (LastX, LastY), wherein the syntax element is skipped from inclusion in the bitstream due to LastX<=Th1 and LastY<=Th2, where Th1 and Th2 are numbers, and wherein Th1 and Th2 are predefined and not signaled in the bitstream, and Th1 and Th2 are equal.

15. The apparatus of claim 14, wherein the instructions upon execution by the processor, cause the processor to:

determine due to the position failing to satisfy a first condition, that the syntax element is skipped from inclusion in the bitstream; and perform the conversion without using the MTS transform.

16. The apparatus of claim 15, wherein the instructions upon execution by the processor, further cause the processor to:

perform the conversion using a default transform that is not explicitly identified in the bitstream.

17. The apparatus of claim 16, wherein the default transform is a discrete cosine transform II (DCT-II).

18. A non-transitory computer-readable storage medium storing instructions that cause a processor to:

check, during a conversion between a current video block of a video and a bitstream of the video, a position of a last non-zero coefficient of the current video block, wherein the position is relative to a top-left position of the current video block; and perform a determination, based on the position, whether a syntax element identifying a transform information for a multiple transform selection (MTS) transform is included in the bitstream or not, wherein the position is represented by coordinates (LastX, LastY), wherein the syntax element is skipped from inclusion in the bitstream due to LastX<=Th1 and LastY<=Th2, where Th1 and Th2 are numbers, and wherein Th1 and Th2 are predefined and not signaled in the bitstream, and Th1 and Th2 are equal.

19. The non-transitory computer-readable storage medium of claim 18, wherein the instructions cause the processor to:

determine due to the position failing to satisfy a first condition, that the syntax element is skipped from inclusion in the bitstream; and perform the conversion without using the MTS transform.

20. A non-transitory computer-readable recording medium storing a bitstream which is generated by a method performed by a video processing apparatus, wherein the method comprises:

checking a position of a last non-zero coefficient of a current video block, wherein the position is relative to a top-left position of the current video block;

performing a determination, based on the position, whether a syntax element identifying a transform information for a multiple transform selection (MTS) transform is included in the bitstream or not; and generating the bitstream based on the determination, wherein the position is represented by coordinates (LastX, LastY), wherein the syntax element is skipped from inclusion in the bitstream due to LastX<=Th1 and LastY<=Th2, where Th1 and Th2 are numbers, and wherein Th1 and Th2 are predefined and not signaled in the bitstream, and Th1 and Th2 are equal.

* * * * *